(12) United States Patent
Kayashima et al.

(10) Patent No.: US 8,036,266 B2
(45) Date of Patent: Oct. 11, 2011

(54) ENCODING/DECODING SYSTEM, ENCODING SYSTEM, AND DECODING SYSTEM

(75) Inventors: Naoshi Kayashima, Fukuoka (JP); Takato Ohashi, Fukuoka (JP); Hiroshi Ohtsuru, Fukuoka (JP); Naoyuki Takeshita, Fukuoka (JP); Kazuhiro Yamashita, Fukuoka (JP); Yousuke Yamaguchi, Fukuoka (JP); Atsushi Ichiki, Kawasaki (JP); Shin Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1022 days.

(21) Appl. No.: 11/976,326

(22) Filed: Oct. 23, 2007

(65) Prior Publication Data
US 2008/0152020 A1 Jun. 26, 2008

(30) Foreign Application Priority Data
Dec. 26, 2006 (JP) ................................. 2006-350521

(51) Int. Cl.
*H04N 7/12* (2006.01)
(52) U.S. Cl. ............................. 375/240.01; 375/240.28
(58) Field of Classification Search ........................ None
See application file for complete search history.

(56) References Cited

U.S. PATENT DOCUMENTS

| | | | | |
|---|---|---|---|---|
| 5,874,995 A | * | 2/1999 | Naimpally et al. | ...... 375/240.25 |
| 5,901,149 A | * | 5/1999 | Itakura et al. | ................. 370/468 |
| 6,091,769 A | * | 7/2000 | Moon | ........................... 375/240 |
| 6,313,879 B1 | * | 11/2001 | Kubo et al. | .................... 348/512 |
| RE38,875 E | * | 11/2005 | Tan et al. | .................... 348/425.4 |
| 7,058,129 B2 | * | 6/2006 | Kato | ........................ 375/240.12 |

FOREIGN PATENT DOCUMENTS

| | | |
|---|---|---|
| JP | 08-079701 | 3/1996 |
| JP | 10-093969 | 4/1998 |
| JP | 10-234043 | 9/1998 |
| JP | 11-239347 | 8/1999 |
| JP | 11-353289 | 12/1999 |
| JP | 2001-346201 | 12/2001 |
| JP | 2002-057656 | 2/2002 |
| JP | 2005-269045 | 9/2005 |

OTHER PUBLICATIONS

Japanese Office Action for corresponding Japanese Application 2006-350521; mailed Jul. 13, 2010.

* cited by examiner

*Primary Examiner* — Hong Cho
(74) *Attorney, Agent, or Firm* — Staas & Halsey LLP

(57) ABSTRACT

Each of a plurality of encoders calculates a first time by adding an encoding delay time commonly determined between the encoders to a value of an STC counter, and transmits a system stream generated by including the calculated first time to a decoder associated with the encoder in one-to-one correspondence, of a plurality of decoders constituting a decoding system. Each of the decoders calculates a second time by adding the first time to an estimated maximum value commonly determined between the decoders by adding a decoding delay time to a value of stream fluctuation of an output time occurring between the encoders, and outputs the divided image data decoded from the system stream to a synthesizer that synthesizes the image data at the calculated second time.

9 Claims, 18 Drawing Sheets

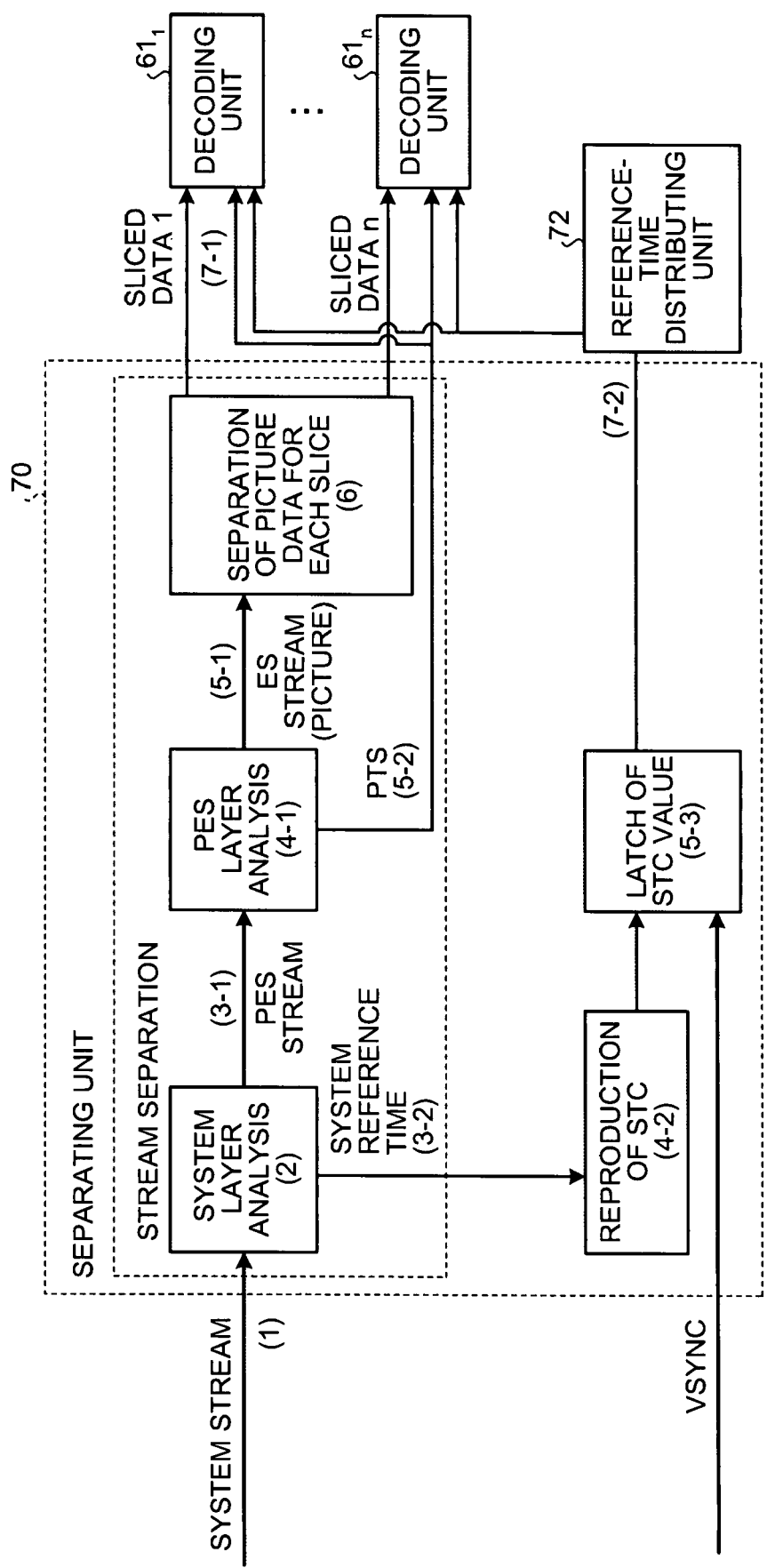

ENCODING/DECODING SYSTEM, ENCODING SYSTEM, AND DECODING SYSTEM

BACKGROUND OF THE INVENTION

1. Field of the Invention

The present invention relates to an encoding/decoding system, an encoding system, and a decoding system, an encoding/decoding method, an encoding method, and a decoding method, and a computer product.

2. Description of the Related Art

With the beginning of terrestrial digital broadcasting, a moving-picture encoding system that encodes a high-resolution moving-picture signal of a high definition television (HDTV) class (hereinafter, "encoding system") and a motion-picture decoding system that decodes encoded data to reproduce the original moving-picture signal (hereinafter, "decoding system") have been needed to be popularized. In the future, an encoding system and a decoding system that can handle high-resolution moving-picture signals of an ultra definition television (UDTV) class will be demanded.

Because the encoding system and the decoding system that handle high-resolution moving-picture signals need high-performance and large-scale resources (such as hardware and software), realization thereof is not easy. Furthermore, even if these systems can be realized, these systems will have to be expensive. Therefore, a handling method of high-resolution moving-picture signals has been proposed, which divides a high-resolution moving-picture signal into a plurality of low-resolution moving-picture signals, and encodes the divided low-resolution moving-picture signals by a low-performance encoding system, or decodes the encoded moving-picture signals by a low-performance decoding system.

For example, in the method disclosed in Japanese Patent Application Laid-Open No. 2001-346201, in an "encoding system", a high-resolution moving-picture signal is divided into a plurality of low-resolution moving-picture signals, the divided low-resolution moving-picture signals are respectively encoded by a plurality of encoders, and the encoded data is integrated in one system stream and transmitted to a "decoding system". In the "decoding system", a plurality of pieces of encoded data are separated from the transmitted one system stream, the separated data is respectively decoded by a plurality of decoders to reproduce a plurality of low-resolution moving-picture signals, and the reproduced low-resolution moving-picture signals are integrated to display the high-resolution moving-picture signal.

In the conventional technique, as explained below, synchronization of a display time cannot be achieved, and therefore the high-resolution moving-picture signal cannot be correctly displayed. That is, in encoding and decoding of the moving-picture signals, the time when the moving-picture signal has been captured by the encoder is generally reproduced as a "display time" by the decoder, and the moving-picture signal is output to an output unit at the "display time". However, with the method disclosed in Japanese Patent Application Laid-Open No. 2001-346201, for example, when a plurality of encoders are used, the time generally deviates from each other between clocks built in the respective encoders. As a result, on the decoder side, synchronization of the "display time" cannot be achieved between the encoded data, and therefore the high-resolution moving-picture signal cannot be displayed correctly.

SUMMARY OF THE INVENTION

It is an object of the present invention to at least partially solve the problems in the conventional technology.

According to an aspect of the present invention, an encoding/decoding system includes an encoding system that includes a plurality of encoders which encode a plurality of pieces of image data, respectively, the pieces of image data being obtained by dividing one-screen image data by a number of encoders; and a decoding system that includes a plurality of decoders and that decodes the pieces of image data encoded by the encoding system to display the one-screen image data, the decoders being associated with the encoders in one-to-one correspondence. Each of the encoders includes a first time calculator that calculates a first time by adding an encoding delay time commonly determined between the encoders as a delay time estimated as a maximum delay time at the time of encoding by the encoder, to a value of an STC counter, the value of the STC counter indicating a time when the encoder captures one of the pieces of image data; and a transmitting unit that transmits a system stream containing the first time calculated by the first time calculator to the decoder associated with the encoder. Each of the decoders includes a second time calculator that calculates a second time by adding the first time extracted from the system stream transmitted by the transmitting unit to a maximum value commonly determined between the decoders, the maximum value being estimated as a maximum sum of a decoding delay time which is at the time of decoding by the decoder, and a value of stream fluctuation occurring between the encoders regarding an output time when the respective encoders output the image data encoded respectively by the encoders; and an output unit that outputs the pieces of image data decoded from the system stream to a synthesizer that synthesizes the image data at the second time calculated by the second time calculator.

According to another aspect of the present invention, an encoding system, which encodes image data of one picture by a plurality of encoders so that each piece of the encoded data encoded by the encoders becomes a slice of one picture, includes a distributing unit that obtains a value of a predetermined STC counter as a reference time so that the value of the predetermined STC counter synchronizes with a video vertical-synchronizing signal, and distributes a value obtained by adding one-cycle value of the video vertical-synchronizing signal to the obtained STC counter value to each of the encoders, the reference time being a reference at the time of encoding a sliced portion of the image data in each of the encoders. Each of the encoders includes a setting unit that holds the value distributed by the distributing unit in a register included in the encoder, upon reception of the distributed value, and sets the value held in the register as the value of the STC counter included in the encoder so that the value synchronizes with the video vertical-synchronizing signal first received after holding the value in the register.

According to still another aspect of the present invention, a decoding system, which decodes a system stream including a video stream in which one picture includes a plurality of slices, by each of a plurality of decoders for each slice, includes a distributing unit that obtains a value of a predetermined STC counter as a reference time so that the value of the predetermined STC counter synchronizes with a video vertical-synchronizing signal, and distributes a value obtained by adding one-cycle value of the video vertical-synchronizing signal to the obtained STC counter value to each of the decoders, the reference time being a reference at the time of decoding the sliced portion of the system stream in each of the decoders. Each of the decoders includes a setting unit that holds the value distributed by the distributing unit in a register included in the decoder, upon reception of the distributed value, and sets the value held in the register as the value of the STC counter included in the decoder so that the value synchronizes with the video vertical-synchronizing signal first received after holding the value in the register.

According to still another aspect of the present invention, an encoding/decoding method, in which a plurality of encoders encode a plurality of pieces of image data, respectively, the pieces of image data being obtained by dividing one-screen image data by a number of encoders, and a plurality of decoders associated with the encoders in one-to-one correspondence decode the pieces of image data encoded by the encoding system to display the one-screen image data, includes calculating a first time by adding an encoding delay time commonly determined between the encoders as a delay time estimated as a maximum delay time at the time of encoding by the encoder, to a value of an STC counter, the value of the STC counter indicating a time when the encoder captures one of the pieces of image data; transmitting a system stream containing the first time calculated to the decoder associated with the encoder; calculating a second time by adding the first time extracted from the system stream transmitted to a maximum value commonly determined between the decoders, the maximum value being estimated as a maximum sum of a decoding delay time which is at the time of decoding by the decoder, and a value of stream fluctuation occurring between the encoders regarding an output time when the respective encoders output the image data encoded respectively by the encoders; and outputting the pieces of image data decoded from the system stream to a synthesizer that synthesizes the image data at the second time calculated.

According to still another aspect of the present invention, a method for encoding image data of one picture by a plurality of encoders so that each piece of the encoded data encoded by the encoders becomes a slice of one picture, includes obtaining a value of a predetermined STC counter as a reference time so that the value of the predetermined STC counter synchronizes with a video vertical-synchronizing signal, the reference time being a reference at the time of encoding a sliced portion of the image data in each of the encoders; distributing a value obtained by adding one-cycle value of the video vertical-synchronizing signal to the obtained STC counter value to each of the encoders; holding the value distributed in a register included in the encoder, upon reception of the distributed value; and setting the value held in the register as the value of the STC counter included in the encoder so that the value synchronizes with the video vertical-synchronizing signal first received after holding the value in the register.

According to still another aspect of the present invention, a method for encoding image data of one picture by a plurality of encoders so that each piece of the encoded data encoded by the encoders becomes a slice of one picture, includes obtaining a value of a predetermined STC counter as a reference time so that the value of the predetermined STC counter synchronizes with a video vertical-synchronizing signal, the reference time being a reference at the time of encoding a sliced portion of the image data in each of the encoders; distributing a value obtained by adding one-cycle value of the video vertical-synchronizing signal to the obtained STC counter value to each of the encoders; holding the value distributed in a register included in the encoder, upon reception of the distributed value; and setting the value held in the register as the value of the STC counter included in the encoder so that the value synchronizes with the video vertical-synchronizing signal first received after holding the value in the register.

According to still another aspect of the present invention, a computer-readable recording medium stores therein a computer program that implements any one of the above methods on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 18 is a schematic diagram for explaining a separating unit in the decoding system;

DETAILED DESCRIPTION OF THE PREFERRED EMBODIMENTS

Figure 1:
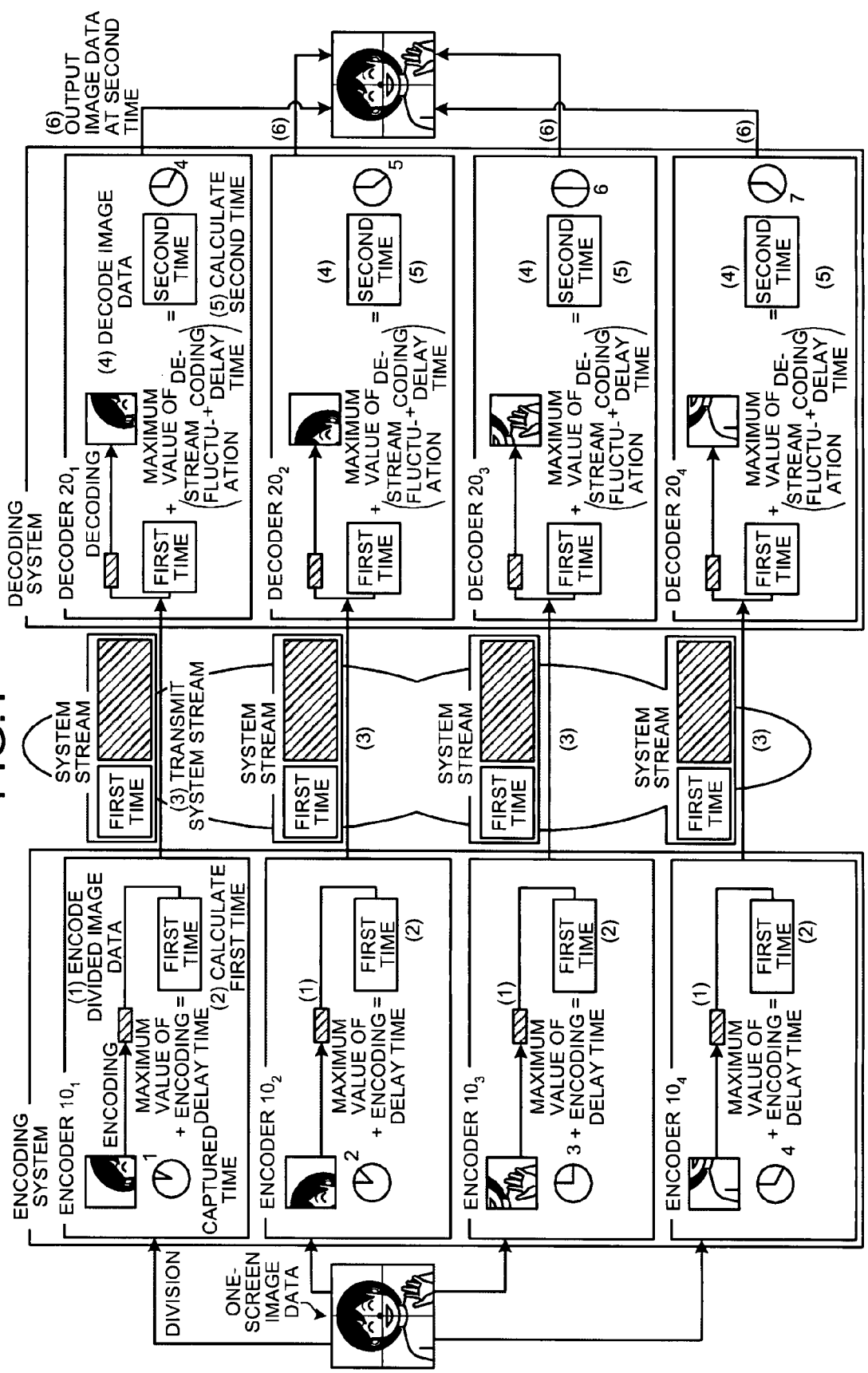
FIG. 1 is a schematic diagram for explaining an outline and characteristics of an encoding/decoding system according to a first embodiment of the present invention.

Exemplary embodiments of encoding/decoding system, an encoding system, and a decoding system according to the present invention will be explained below in detail with reference to the accompanying drawings. Main terms used in a first embodiment of the present invention, an outline and characteristics of an encoding/decoding system according to the first embodiment, a configuration thereof, process procedures performed by the encoding/decoding system of the first embodiment, and effects of the first embodiment will be explained sequentially, and other embodiments will be explained later.

Main terms used in the first embodiment are explained first. The term "encoding/decoding system" used in the embodiment stands for a system that transmits "image data" such as a moving-picture signal via a transmission system such as the Internet, and stores the image data in a recording medium. In other words, the "image data", which is high-resolution moving-picture signals of the HDTV class or the UDTV class, has a huge data amount, and therefore cannot be transmitted or stored directly. Therefore, the "encoding system" of the "encoding/decoding system" performs "encoding" to compress the data amount of the "image data", and the "image data" with the data amount being compressed is transmitted or stored. On the other hand, the "decoding system" of the "encoding/decoding system" "decodes" the "image data" "encoded" by the "encoding system" to reproduce the high-resolution "image data".

As current "encoding" and "decoding" techniques, for example, H.264/MPEG-4 Advanced Video Coding (AVC) and H.264/AVC are representative. However, when the high-resolution "image data" of the HDTV class or the UDTV class is to be "encoded" or "decoded", the "encoding system" and the "decoding system" require high-performance and large-scale resources, and therefore realization thereof is not easy. Therefore, in the "encoding/decoding system" according to the present invention, the high-resolution "image data" is not directly "encoded" or "decoded". However, the "encoding/decoding system" employs a method of dividing the high-resolution "image data" into a plurality of pieces of low-resolution "image data", and encoding or decoding the divided low-resolution "image data" by a low-performance "encoding system" or a low-performance "decoding system".

More specifically, the "encoding system" in the present invention includes a plurality of low-performance "encoders", divides "image data" of "one screen" into the number of the "encoders", and encodes the divided "image data" by the respective "encoders". On the other hand, the "decoding system" in the present invention includes a plurality of low-performance "decoders" associated with the "encoders" in one-to-one correspondence, and respectively decodes the "image data" encoded by the "encoding system" by the "decoders" and outputs the decoded "image data" to a synthesizer that synthesizes the "image data".

In this case, there is a problem how to have the display time matched each other at the time of outputting the "image data" to the synthesizer in the "decoding system". In the general "encoding/decoding system", the "decoder" reproduces the time when the "image data" has been captured by the "encoder" as the display time, and outputs the decoded "image data" to an output unit at the reproduced display time, thereby correctly displaying the "image data" of "one screen". However, as in the "encoding/decoding system" according to the present invention, when a plurality of "encoders" are used in the "encoding system", generally, the time deviates from each other between clocks built in the respective "encoders". As a result, on the "decoder" side, synchronization of the display time cannot be achieved between the "image data", and the "image data" cannot be displayed correctly.

Therefore, it is important how to have the display time matched each other, when the "encoding/decoding system" of the present invention decodes, in the "decoding system", the "image data" divided by the number of "encoders" in the encoding system and respectively encoded by the "encoders", and displays the "image data" as the "image data" of "one screen".

The outline and characteristics of the encoding/decoding system according to the first embodiment are explained below with reference to FIG. 1. FIG. 1 is a schematic diagram for explaining the outline and characteristics of the encoding/decoding system according to the first embodiment.

In the encoding/decoding system according to the first embodiment, the encoding system including the encoders encodes the image data divided from one-screen image data by the number of encoders by respective encoders to transmit the image data to the decoding system. The decoding system decodes the transmitted image data to display the one-screen image data. Therefore, it is a main characteristic of the encoding/decoding system to correctly display a high-resolution moving-picture signal.

Briefly explaining the main characteristic, the encoding/decoding system according to the first embodiment includes, as shown in FIG. 1, the encoding system and the decoding system. Further, as shown in FIG. 1, the encoding system includes a plurality of encoders, and the decoding system includes a plurality of decoders so that the encoder and the decoder are associated with each other in one-to-one correspondence.

Furthermore, as shown in FIG. 1, the encoding/decoding system according to the first embodiment uses a method of transmitting one system stream from one encoder to one decoder. Therefore, a plurality of system streams are transmitted from the encoding system to the decoding system. That is, in the encoding/decoding system according to the first embodiment, one-screen image data is divided into a plurality of pictures corresponding to the number of encoders, and one picture is encoded by one encoder and decoded by one decoder.

In such a configuration, in the encoding system in the first embodiment, respective encoders encode the divided one-picture image data (see FIG. 1(1)). For example, as shown in FIG. 1, when the number of the encoders is four, the number of the decoders in one-to-one correspondence therewith is also four, and the encoding system divides the one-screen image data into four-picture image data. An encoder $10_1$ encodes one picture, which is the upper left image data.

In the encoding system, respective encoders calculate a first time by adding an encoding delay time commonly determined between the encoders as a delay time, which is an estimated maximum delay time at the time of encoding by the encoder, to a value of STC-counter indicating time when the divided image data has been captured by the encoder (see FIG. 1(2)).

For example, as shown in FIG. 1, the encoder $10_1$ calculates the first time by adding the encoding delay time commonly determined between the encoders $10_1$ to $10_4$ (in FIG. 1, "maximum value of the encoding delay time") to the time "1:00", when one picture of the upper left image data has been captured. In FIG. 1, for convenience of explanation, an image of a clock indicating "1:00" is displayed as the captured time. Actually, however, it is a value of the STC counter included in the encoding system. The encoding delay time is generally derived in a process of designing.

In the encoding system, respective encoders transmit a generated system stream including the first time to the decoder associated with the encoder in one-to-one correspondence (see FIG. 1(3)). For example, the encoder $10_1$ transmits one generated system stream including data obtained by encoding one picture and the first time to a decoder $20_1$.

Subsequently, in the decoding system, respective decoders decode the image data from the data obtained by encoding one picture, included in one system stream (see FIG. 1(4)). For example, the decoder $20_1$ decodes the upper left image data from the data obtained by encoding one picture.

In the decoding system, respective decoders calculate a second time by adding the first time extracted from the transmitted system stream to a maximum value commonly determined between the decoders as a value estimated as a maximum sum of a decoding delay time, which is a delay time occurring at the time of decoding by the decoder, and a stream fluctuation value (see FIG. 1(5)). The stream fluctuation value indicates fluctuation occurring between the encoders, regarding an output time when the image data encoded by the respective encoders is output by the respective encoders.

For example, as shown in FIG. 1, the decoder $20_1$ adds the stream fluctuation occurring between the encoders $10_1$ to $10_4$ to the decoding delay time of the decoder $20_1$, and calculates a second time as "4:00" by adding the first time (in FIG. 1, the "first time") to the value commonly determined by decoders $20_1$ to $20_4$ (in FIG. 1, the "maximum value of (stream fluctuation+decoding delay time)"). In FIG. 1, for convenience of explanation, an image of a clock indicating "4:00" is displayed as the second time. Actually, however, it is a value of the STC counter included in the decoding system. The stream fluctuation is generally acquired by measurement or the like, and the decoding delay time is derived in the process of designing.

In the decoding system, the respective decoders output the image data decoded from the system stream to the synthesizer that synthesizes the "image data" at the second time (see FIG. 1(6)). The second time calculated by the decoder 1 is "4:00", the second time calculated by the decoder $20_2$ is "5:00", the second time calculated by the decoder $20_3$ is "6:00", and the second time calculated by the decoder $20_4$ is "7:00", which are different from each other. There is a doubt whether the display time can be made to match each other when the image data is output at the second time.

In the encoding/decoding system of the present invention, however, it is considered to be natural that the time deviates between clocks built in the respective encoders. It is also considered to be natural that even if the decoder side reproduces the display time, the value itself of the display time deviates between the respective decoders. It is important in the present invention that a difference between the time when the encoder has captured the image data and the time when the decoder associated with the encoder in one-to-one correspondence outputs the image data becomes common between the decoders (in FIG. 1, the difference between the captured time and the output time is "3:00" in any of the decoders $20_1$ to $20_4$).

That is, for example, it is assumed that the decoder $20_1$ determines the difference from the captured time and reproduces the display time, taking into consideration the encoding delay specialized for the encoder $10_1$ associated with the decoder $20_1$ in one-to-one correspondence, and the decoder $20_2$ determines the difference from the captured time and reproduces the display time, taking into consideration the encoding delay specialized for the encoder $10_2$ associated with the decoder $20_2$ in one-to-one correspondence. The difference between the captured time and the output time then becomes different between the decoders $20_1$ and $20_2$. In the end, display of the image decoded by the decoder $20_1$ and display of the image decoded by the decoder $20_2$ cannot be synchronized.

In the encoding/decoding system of the present invention, the respective decoders do not determine the difference from the captured time to reproduce the display time, taking the encoding delay into consideration arbitrarily. However, the decoders determine a difference common to the respective decoders $20_1$ to $20_4$. Therefore, all the decoders can display the image data at the same time. Further, the common difference is determined, taking delay into consideration, which will occur at maximum, such as the delay time occurring at maximum at the time of encoding by the encoders. Therefore, there is no possibility that output of the image data decoded by a specific decoder affected by the delay at the time of encoding or decoding is too late for the display time.

Thus, the encoding/decoding system according to the first embodiment can synchronize the display time, thereby enabling correct display of the high-resolution moving-picture signal.

More specifically, the respective decoders calculate the second time by adding an offset B (maximum value of stream fluctuation and decoding delay time commonly determined between the decoders) to the first time obtained by adding an offset A (maximum value of encoding delay time commonly determined between the encoders) to an ideal presentation time stamp (PTS: time when the encoder has captured the image data), and output the decoded image data to the synthesizer at the second time. Accordingly, synchronization of the display time can be achieved, and the high-resolution moving-picture signal can be correctly displayed.

Figure 2:
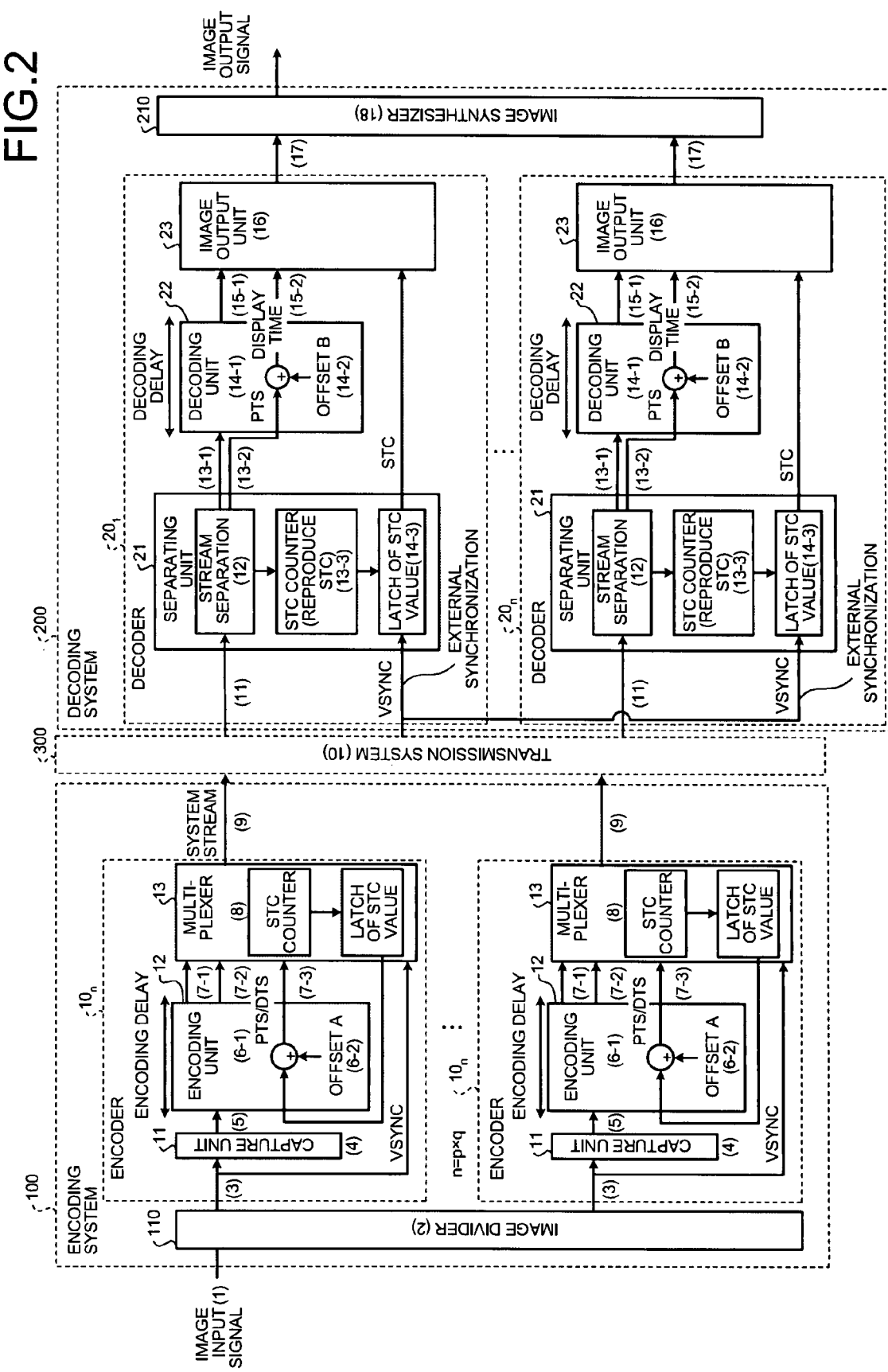
FIG. 2 is a block diagram of the configuration of the encoding/decoding system according to the first embodiment.
Figure 3:
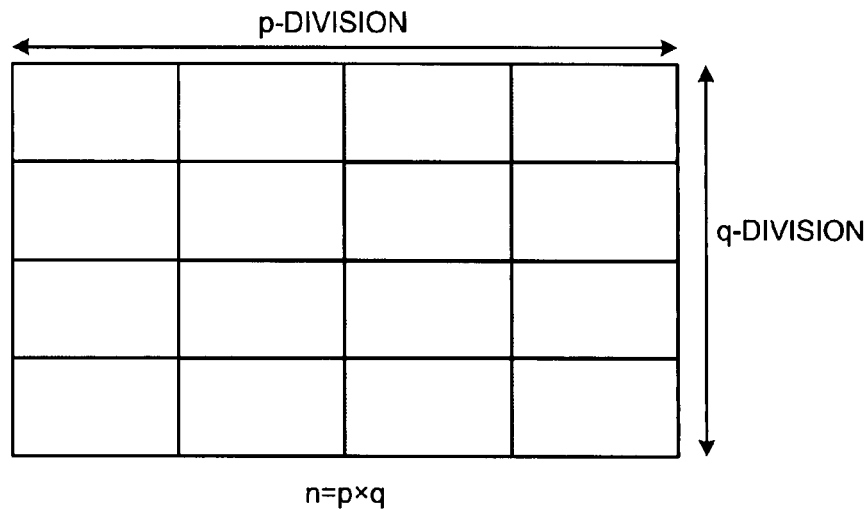
FIG. 3 is a schematic diagram for explaining division of the image data.
Figure 4:
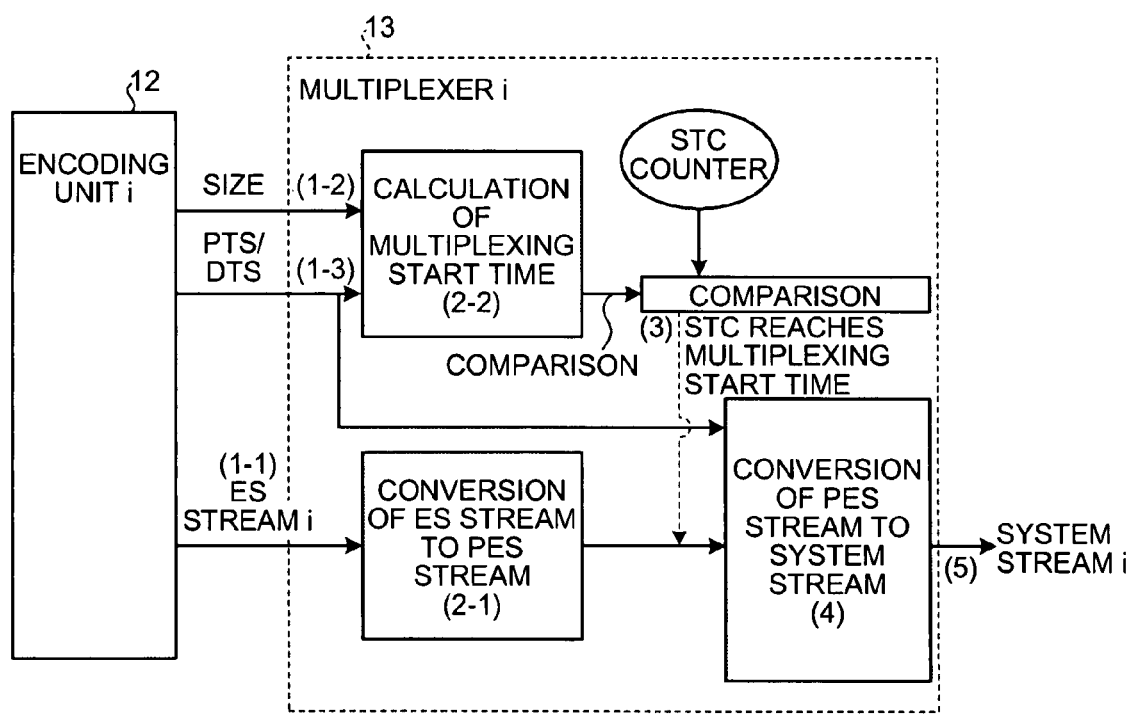
FIG. 4 is a schematic diagram for explaining a multiplexer in an encoder.
Figure 5:
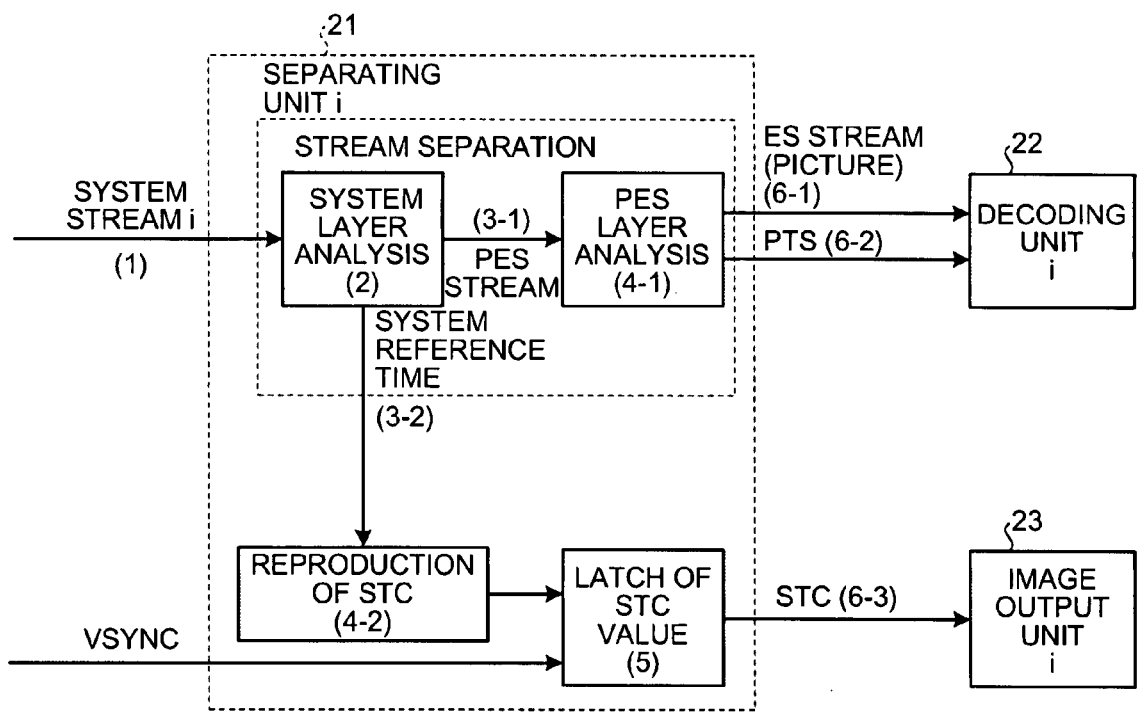
FIG. 5 is a schematic diagram for explaining a separating unit in a decoder.
Figure 6:
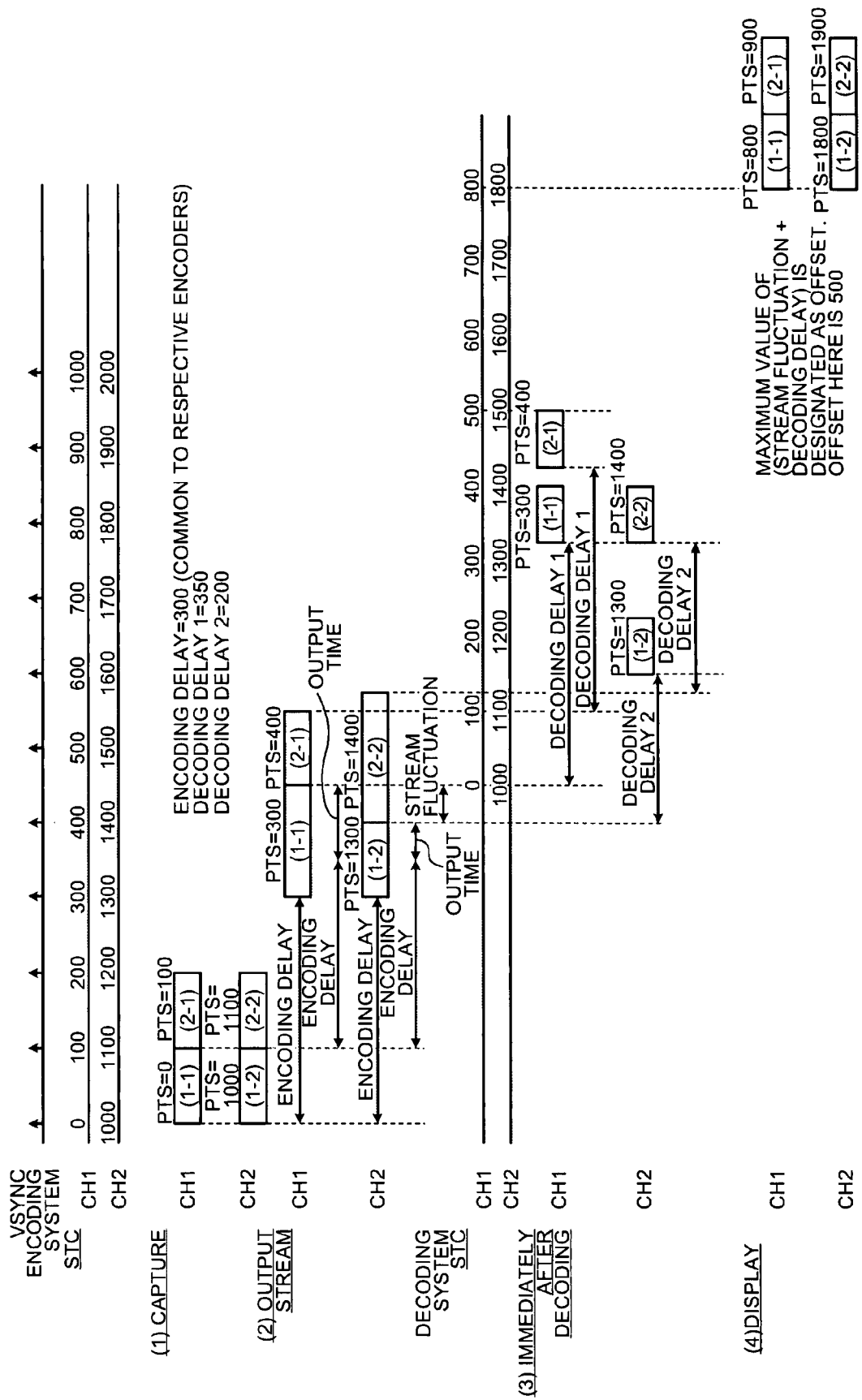
FIG. 6 is a schematic diagram for explaining matching of a display time (PTS)

The configuration of the encoding/decoding system according to the first embodiment is explained with reference to FIGS. 2 to 6. FIG. 2 is a block diagram of the configuration of the encoding/decoding system according to the first embodiment; FIG. 3 is a schematic diagram for explaining division of the image data; FIG. 4 is a schematic diagram for explaining a multiplexer in the encoder; FIG. 5 is a schematic diagram for explaining a separating unit in the decoder; and FIG. 6 is a schematic diagram for explaining matching of the display time (PTS).

The configuration of the encoding/decoding system according to the first embodiment is first explained with reference to FIG. 2. As shown in FIG. 2, the encoding/decoding system according to the first embodiment includes an encoding system 100 and a decoding system 200, and a transmission system 300 is present therebetween. The transmission system 300 receives an input of the system stream from the encoding system 100, converts a format to perform high-speed transmission of the system stream, and reconverts the format to output the system stream to the decoding system 200. It is assumed that transmission delay is constant in any combination of the encoder 10 and the decoder 20.

As shown in FIG. 2, the encoding system 100 includes a plurality of encoders $10_1$ to $10_n$, and the decoding system 200 includes a plurality of decoders $20_1$ to $20_n$. The encoder 10 and the decoder 20 are associated with each other in one-to-one correspondence, such that the encoder $10_1$ and the decoder $20_1$ are associated with each other and the encoder $10_n$ and the decoder $20_n$ are associated with each other. The configuration of the encoding system 100 is explained first, the configuration of the decoding system 200 is explained next, and finally, matching of the display time, which is a main characteristic of the present invention, will be explained. Numbers from (1) to (18) shown in FIG. 2 represent one example of a flow of the image data in the whole encoding/decoding system.

The encoding system 100 according to the first embodiment receives an input of the high-resolution image data, divides the data into a plurality of pieces of low-resolution image data, and encodes the image data by a plurality of encoders to output a system stream (TS stream or PS stream). The encoding system 100 includes the encoder 10 and an image divider 110 as units closely related to the present invention.

The image divider 110 receives an input of the high-resolution image data, divides the received high-resolution image data into low-resolution image data, and inputs the divided low-resolution image data to the encoders $10_1$ to $10_n$ (see FIGS. 2(1) and (2)).

For example, the image divider 110 divides the high-resolution image data into "n" low-resolution image data, as shown in FIG. 3, by dividing the high-resolution image data into "p" horizontally and "q" vertically. The image divider 110 allocates a CH number to each piece of the divided low-resolution image data, and inputs the divided low-resolution image data to each of the encoders $10_1$ to $10_n$ for each CH.

Each encoder 10 encodes the low-resolution image data divided by the image divider 110 to output the system stream. The encoder 10 includes a capture unit 11, an encoding unit 12, and a multiplexer 13 as units closely related to the present invention. The encoders $10_1$ to $10_n$ for each CH are explained next. The "encoding unit 12" may also be referred to as a "first time calculator", and the multiplexer 13 may also be referred to as a "transmitting unit".

The capture unit 11 receives an input of the divided low-resolution image data (an analog signal or an SDI signal) from the image divider 110, captures the received image data, stores the captured image data in a memory, and then, outputs the stored image data to the encoding unit 12 (see FIG. 2(3) to (5)).

The encoding unit 12 receives an input of the divided low-resolution image data from the capture unit 11, compresses and encodes the received image data (for example, uses an H.264 encoding method, hereinafter, referred to as "encodes"), and outputs the encoded image data (ES stream) to the multiplexer 13 (see FIGS. 2(5), (6-1), and (7-1)). The encoding unit 12 further calculates an occupying amount of video VBV buffer of ES-stream, and outputs the encoded image data (ES stream) to the multiplexer 13, as well as a calculation result of the occupying amount of video VBV buffer of the ES-stream to the multiplexer 13 (see FIGS. 2(6-1) and (7-2)).

The encoding unit 12 receives an input of an STC counter value (PTS) indicating the time when the image data has been captured by the capture unit 11, from the multiplexer 13. The encoding unit 12 then calculates PTS/DTS, which may also be referred to as a "first time", by adding an offset A (encoding delay time commonly determined between the encoders $10_1$ to $10_n$ as the delay time that will occur at maximum at the time of encoding by the encoder 10) to the received STC counter value, and outputs the calculated PTS/DTS to the multiplexer 13 (see FIGS. 2 (6-2) and (7-3)).

That is, PTS/DTS is defined as "PTS/DTS=(STC counter value indicating the time when the image data has been captured by the capture unit 11)+(offset A)", and the offset A is defined as "offset A=encoding delay time commonly determined between the encoders $10_1$ to $10_n$ as the delay time which will occur at maximum at the time of encoding by the encoder 10)". According to the first embodiment, the offset A is set as a fixed value in the encoder 10. It will be described later in detail how the "first time" calculated by the encoder 12 is associated with the "matching of the display time", which is a main characteristic of the present invention.

Figure 8:
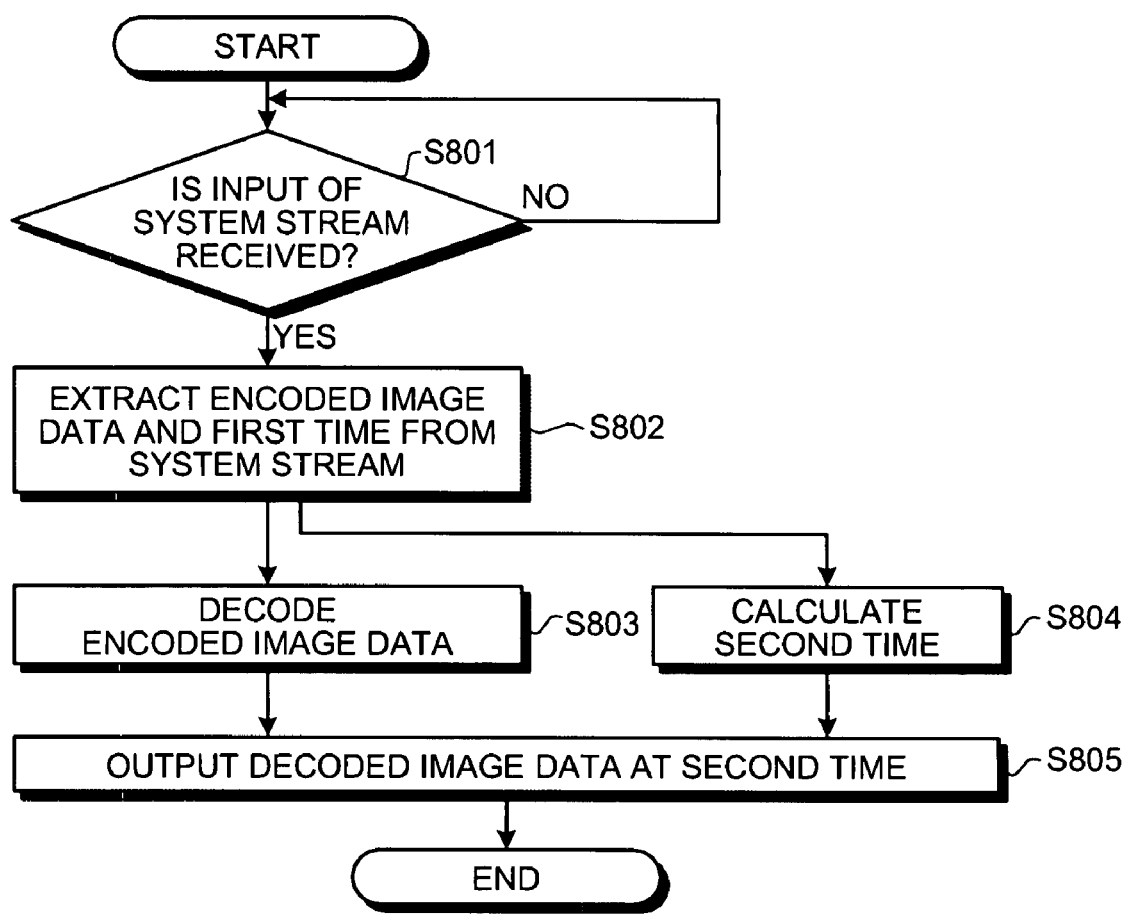
FIG. 8 is a flowchart of a process procedure performed by the decoder according to the first embodiment.

The multiplexer 13 receives the encoded image data (ES stream), the calculation result of the occupying amount of video VBV buffer of the ES-stream, and an input of the PTS/DTS from the encoding unit 12, and converts the received ES stream to a PES stream and the converted PES stream to a system stream (see FIG. 2(7-1) to (7-3) and FIG. 8).

The multiplexer 13 has an STC counter built therein, as shown in FIG. 2, and outputs the STC counter value (PTS) indicating the time when the image data has been captured by the capture unit 11 to the encoding unit 12 (see FIG. 2(8)). Further, the multiplexer 13 outputs the converted system stream to the decoding system 200 (via the transmission system 300), when the STC counter value indicates a multiplexing start time (see FIG. 2(9)).

The multiplexer 13 is explained in detail with reference to FIG. 4. At first, the multiplexer 13 receives an input of the encoded image data (ES stream) from the encoder 12 (see FIG. 4(1-1)), and converts the received ES stream to the PES stream (see FIG. 4(2-1)).

The multiplexer 13 concurrently receives an input of the calculation result of the occupying amount of video VBV buffer of the ES-stream from the encoding unit 12 (see FIG. 4(1-2)) and an input of the PTS/DTS from the encoding unit 12 (see FIG. 4(1-3)), and calculates the multiplexing start time (see FIG. 4(2-2)). The multiplexing start time is defined as "multiplexing start time=(DTS)−(occupying amount of video VBV buffer/video bit rate)".

The multiplexer 13 compares the calculated multiplexing start time with the STC counter value (see FIG. 4(3)), and converts the PES stream to the system stream immediately before the STC counter value reaches the multiplexing start time (see FIG. 4(4)). Lastly, the multiplexer 13 outputs the converted system stream (see FIG. 4(5)).

Returning to FIG. 2, the decoding system 200 according to the first embodiment receives an input of the system stream, decodes the low-resolution image data by a plurality of decoders, and synthesizes the decoded low-resolution image data to output the high-resolution image data. The decoding system 200 includes the decoders $20_1$ to $20_1$ and an image synthesizer 210 as the units closely related to the present invention.

Each decoder 20 receives an input of the system stream, decodes the image data extracted from the received system stream, and output the low-resolution image data. The decoder 20 includes a separating unit 21, a decoding unit 22, and an image output unit 23, as the units closely related to the present invention. The "decoding unit 22" may also be referred to as a "second time calculator", and the "image output unit 23" may also be referred to as an "output unit".

The separating unit 21 receives an input of the system stream from the encoding system 100 (via the transmission system 300), converts the received system stream to the PES stream and the converted PES stream to the ES stream, and outputs the converted ES stream to the decoding unit 22 (see FIG. 2(10) to (13-1)). The separating unit 21 extracts the PTS/DTS (first time) from the PES stream, and outputs the extracted PTS/DTS to the decoding unit 22 (see FIGS. 2(12) and (13-2)).

Further, the separating unit 21 has, as shown in FIG. 2, an STC counter built therein, extracts a system reference time (PCR or SCR) from the system stream, and reproduces the STC counter to set the time as the STC counter value (see FIGS. 2(12) and (13-3)). The separating unit 21 latches the STC counter value at a timing of input of a vertical synchronization (VSYNC) signal and outputs the latched STC counter value to the image output unit 23 (see FIG. 2(14-3)).

The separating unit 21 is explained in detail with reference to FIG. 5. The separating unit 21 receives an input of the system stream from the encoding system 100 (see FIG. 5(1)), and extracts the PES stream and the system reference time according to analysis of a system layer (see FIGS. 5(2), (3-1) and (3-2)). The separating unit 21 then extracts the ES stream (picture data) and PTS from the PES stream according to analysis of a PES layer, and outputs the extracted ES stream and the PTS to the decoding unit 22 (see FIGS. 5(6-1) and (6-2)).

The separating unit 21 concurrently reproduces the STC counter based on the extracted system reference time (see FIG. 5(4-2)). The separating unit 21 latches the STC counter value at the timing of input of the VSYNC signal, and outputs the latched STC counter value to the image output unit 23 (see FIGS. 5(5) and (6-3)).

Returning to FIG. 2, the decoding unit 22 receives an input of the ES stream and the PTS/DTS from the separating unit 21, decodes the received ES stream to the low-resolution image data, and outputs the decoded low-resolution image data to the image output unit 23 (see FIGS. 2(13-1), (13-2), (14-1), and (15-1)).

Further, the decoding unit 22 receives an input of the PTS/DTS from the separating unit 21, calculates the display time, which may also be referred to as a "second time", by adding an offset B to the received PTS/DTS (first time), and outputs the calculated display time to the image output unit 23 (see FIGS. 2(13-2), (14-2), and (15-2)). The offset B indicates an estimated maximum value commonly determined between the decoders $20_1$ to $20_n$ by adding the decoding delay time, which occurs at the time of decoding by the decoder 20, to a value of stream fluctuation occurring between the encoders $10_1$ to $10_n$ regarding the output time when the respective encoders $10_1$ to $10_n$ output the image data encoded, respectively, by the encoders.

That is, the display time is defined as "display time= (PTS)+(offset B)", and the offset B is defined as "offset B=an estimated maximum value commonly determined between the decoders $20_1$ to $20_n$ by adding the decoding delay time, which occurs at the time of decoding by the decoder 20, to a value of stream fluctuation occurring between the encoders $10_1$ to $10_n$ regarding the output time when the respective encoders $10_1$ to $10_n$ output the image data encoded, respectively, by the encoders $10_1$ to $10_n$. It will be explained later in detail how the "second time" calculated by the decoding unit 22 is associated with the "matching of the display time", which is the main characteristic of the present invention.

The image output unit 23 receives an input of the low-resolution image data and the display time from the decoding unit 22, and an input of the STC counter value from the separating unit 21. When the received STC counter value indicates the display time, the image output unit 23 outputs the received low-resolution image data to the image synthesizer 210 (see FIGS. 2(15-1), (15-2), (16), and (17)).

The image synthesizer 210 receives an input of the low-resolution image data, respectively, from the decoders $20_1$ to $20_n$, and synthesizes the received low-resolution image data to output the high-resolution image data (see FIG. 2(18)).

Subsequently, a mechanism by which the encoding/decoding system of the present invention can achieve synchronization of the display time and correctly display the high-resolution image data is explained with reference to FIG. 6. The assumption in FIG. 6 is explained first. "VSYNC" means a video vertical synchronizing signal, indicating a section of the divided image data. In the encoding system according to the first embodiment, "VSYNC" is input to each encoder 10, as shown in FIG. 2, together with the image data input from the image divider 110 to the encoder 10. Further, in the decoding system 200 according to the first embodiment, "VSYNC" is provided from an external device as shown in FIG. 2. In FIG. 6, "VSYNC" is issued with the STC counter value at an interval of "100".

"CH1" and "CH2" in FIG. 6 are CH numbers allocated to the encoders in the encoding system 100. For example, "CH1" is allocated to the encoder $10_1$, and "CH2" is allocated to the encoder $10_2$. "CH1" is hereafter used as the one indicating the encoder $10_1$ or the decoder $20_1$, and "CH2" is used as the one indicating the encoder $10_2$ or the decoder $20_2$. In FIG. 6, there is a difference of "1000" between the STC counter value of "CH1" and the STC counter value of "CH2". The STC counter value of "CH1" is started with a value of "0", and the STC counter value of "CH1" is started with a value of "1000".

In FIG. 6, it is assumed that the offset A is "300", the decoding delay time of "CH1" is "350", the decoding delay time of "CH2" is "200", and the offset B is "500". The offset A stands for a maximum value commonly determined between the encoders $10_1$ to $10_n$ as a delay time, which will occur at maximum at the time of encoding by the encoder 10. The offset B stands for an estimated maximum value commonly determined between the decoders $20_1$ to $20_n$ by adding the decoding delay time, which occurs at the time of decoding by the decoder 20, to a value of stream fluctuation occurring between the encoders $10_1$ to $10_n$ regarding the output time when the respective encoders $10_1$ to $10_n$ output the image data encoded, respectively, by the encoders.

With such an assumption, capturing of image data (1-1) by the capture unit 11 of the encoder $10_1$ ("CH1") and capturing of image data (1-2) by the capture unit 11 of the encoder $10_2$ ("CH2") are performed simultaneously. At this time, the respective encoding units 12 in the encoder $10_1$ and the encoder $10_2$ latch the STC counter value (PTS) indicating the time when the image data (1-1) and the image data (1-2) have been captured by the capture units 11. The latched STC counter values are such that "CH1" is "PTS=0" and "CH2" is "PTS=1000". Likewise, the STC counter value indicating the time when image data (2-1) and (2-2) have been captured by the capture units 11 are such that "CH1" is "PTS=100" and "CH2" is "PTS=1100".

The image data is, respectively, encoded by "CH1" and "CH2". At this time, in the PTS, because the offset A is added, PTS is "300" by "CH1" regarding the image data (1-1), PTS is "1300" by "CH2" regarding the image data (1-2), PTS is "1400" by "CH1" regarding the image data (2-1), and PTS is "1400" by "CH2" regarding the image data (2-2). As seen from the timing of stream output of the image data (2-1) and (2-2), stream output is started for the image data (2-1) at a point in time when output of the image data (1-1) has finished, and stream output is started for the image data (2-2) at a point in time when output of the image data (1-2) has finished. The stream fluctuation of the offset B stands for, as shown in FIG. 6, a difference of output time due to a difference of the occupying amount of the video VBV buffer between "CH1" and "CH2".

On the other hand, the decoding unit 22 in the decoder $20_1$ receives a system stream transmitted from the encoding system 200 via the transmission system 300, and decodes the image data. In the first embodiment, because it is assumed that the transmission delay is constant between CHs, "transmission delay=0". As shown in FIG. 6(3), if it is assumed that the decoded image data is output regardless of the second time calculated in the present invention, it is seen that the timing at which decoding finishes is quite different between "CH1" and "CH2". Further, when "PTS=1300" for image data (1-2) by "CH2" is compared with the STC counter value of "CH2", it is seen that output of image data (1-2) is in time (PTS has enough time relative to the STC counter value). When "PTS=1400" for image data (2-2) by "CH2" is compared with the STC counter value of "CH2", it is seen that output of image data (2-2) is in time (PTS has enough time relative to the STC counter value). On the contrary, when "PTS=300" for image data (1-1) by "CH1" is compared with the STC counter value of "CH1", it is seen that output of image data (1-1) is too late, and when "PTS=400" for image data (2-1) is compared with the STC counter value of "CH1", it is seen that output of image data (2-1) is too late.

In the present invention, therefore, as shown in FIG. 6(4), the offset B assumed to be "500" is added to the PTS. In the end, therefore, the display time of image data (1-1) by "CH1" becomes "PTS=800", the display time of image data (2-1) by "CH1" becomes "PTS=900", the display time of image data (1-2) by "CH2" becomes "PTS=1800", and the display time of image data (2-2) by "CH2" becomes "PTS=1900". As shown in FIG. 6, according to the display time, synchronization of the display time can be achieved between "CH1" and "CH2", and the high-resolution image data can be correctly displayed.

Figure 7:
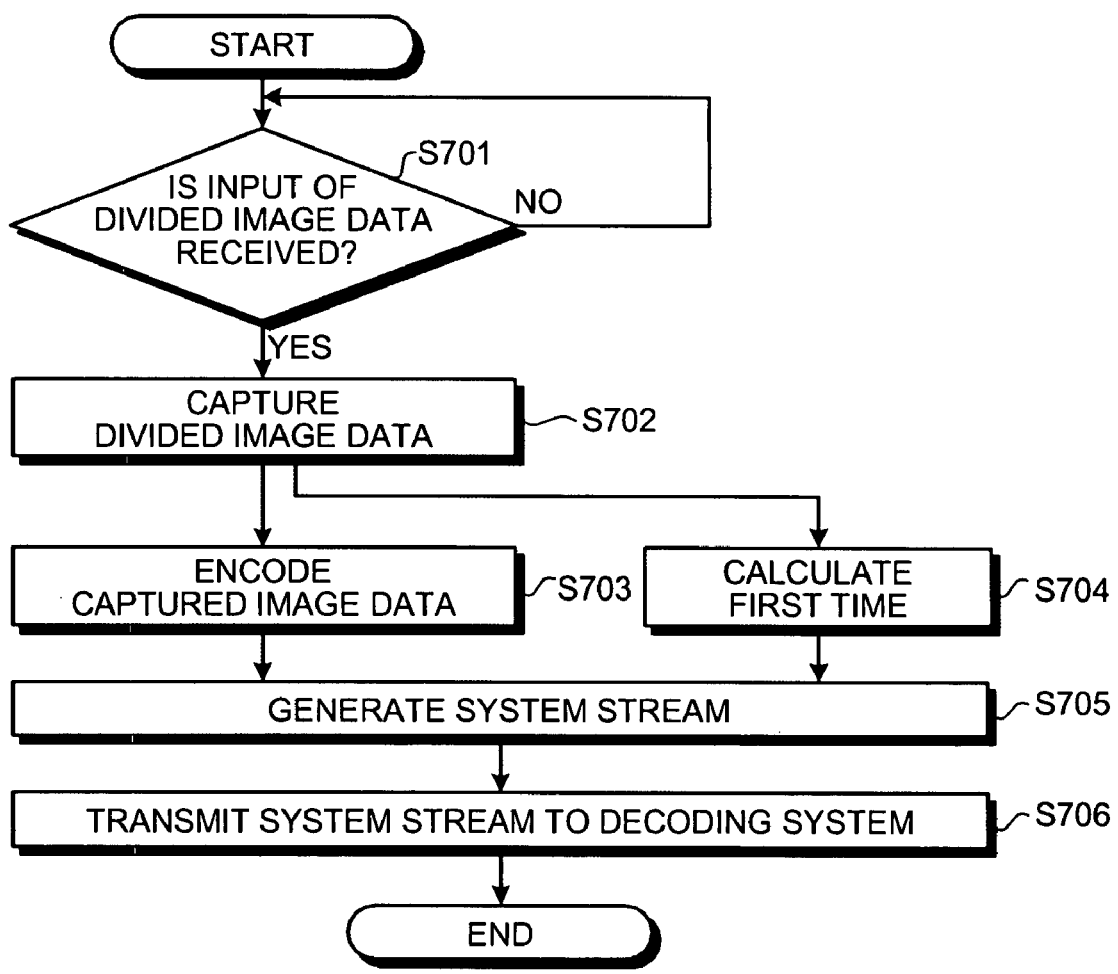
FIG. 7 is a flowchart of a process procedure performed by the encoder according to the first embodiment.

A process procedure performed by the encoding/decoding system according to the first embodiment is explained with reference to FIGS. 7 and 8. FIG. 7 is a flowchart of a process procedure performed by the encoder according to the first embodiment, and FIG. 8 is a flowchart of a process procedure performed by the decoder according to the first embodiment.

As shown in FIG. 7, the encoding system according to the first embodiment determines whether an input of the divided image data has been received (step S701). When the input has not been received (NO at step S701), the encoding system returns to a process for determining whether the input of the divided image data has been received.

On the other hand, when the input has been received (YES at step S701), the encoding system captures the divided image data by the capture unit 11 in the encoder 10 (step S702).

The encoding system encodes the captured image data in the encoding unit 12 in the encoder 10 (step S703), to calculate the first time (step S704). Specifically, in the encoding system, the encoding unit 12 in the encoder 10 receives an input of the STC counter value (PTS) indicating the time when the image data has been captured by the capture unit 11 from the multiplexer 13. The encoding unit 12 then calculates the first time by adding the offset A (encoding delay time commonly determined between the encoders $10_1$ to $10_n$ as delay time, which will occur at maximum at the time of encoding by the encoder 10), to the received STC counter value.

In the encoding system, the multiplexer 13 in the encoder 10 generates a system stream including the first time (step S705), and transmits the system stream to the decoder associated with the encoder in one-to-one correspondence, of the decoders constituting the decoding system (S706).

On the other hand, as shown in FIG. 8, the decoding system determines whether an input of the system stream has been received (step S801). When the input has not been received (NO at step S801), the decoding system returns to a process for determining whether the input of the system stream has been received.

On the other hand, when the input has been received (YES at step S801), the decoding system extracts the encoded image data and the first time from the system stream by the separating unit 21 in the decoder 20 (step S802).

In the decoding system, the decoding unit 22 in the decoder 20 decodes the encoded image data (step S803), and calculates the second time (step S804). Specifically, the decoding unit 22 in the decoder 20 receives an input of PTS/DTS from the separating unit 21, and calculates the second time by adding the received PTS/DTS (the first time) to the offset B (an estimated maximum value commonly determined between the decoders $20_1$ to $20_n$ by adding the decoding delay time, which occurs at the time of decoding by the decoder 20, to a value of stream fluctuation occurring between the encoders $10_1$ to $10_n$ regarding the output time when the respective encoders $10_1$ to $10_n$ output the image data encoded, respectively, by the encoders).

The decoding system outputs the decoded image data to the image synthesizer 210 at the second time by the image output unit 23 in the decoder 20 (step S805).

Thus, the encoding/decoding system according to the first embodiment can achieve synchronization of the display time, and a high-resolution moving-picture signal can be correctly displayed.

According to the first embodiment, in the encoding/decoding system, the encoding system including a plurality of encoders encodes a plurality of pieces of image data divided by the number of encoders from one-screen image data by the respective encoders and transmits the encoded image data to the decoding system. The decoding system decodes the transmitted image data to display the one-screen image data. Each of the encoders calculates the first time by adding an encoding delay time commonly determined between the encoders as a delay time, which will occur at maximum at the time of encoding by the encoder, to a value of the STC counter indicating the time when the divided image data has been captured by the encoder. Each encoder then transmits the generated system stream including the calculated first time to the decoder associated with the encoder in one-to-one correspondence, of the decoders constituting the decoding system. Each of the decoders calculates the second time by adding the first time extracted from the transmitted system stream to a maximum value commonly determined between the decoders. The maximum value is estimated as a maximum sum of a decoding delay time which is at the time of decoding by the decoder, and a value of stream fluctuation occurring between the encoders regarding the output time when the respective encoders output the image data encoded respectively by the encoders. The respective decoders then output the divided image data decoded from the system stream to the image synthesizer that synthesizes the image data at the calculated second time. Accordingly, synchronization of the display time can be achieved, thereby enabling correct display of the high-resolution moving-picture signal.

More specifically, the respective decoders calculate the second time by adding an offset B (maximum value of stream fluctuation and decoding delay time commonly determined between the decoders) to the first time obtained by adding an offset A (maximum value of encoding delay time commonly determined between the encoders) to an ideal presentation time stamp (PTS: time when the encoder has captured the image data), and output the decoded image data to the synthesizer at the second time. Accordingly, synchronization of the display time can be achieved, and the high-resolution moving-picture signal can be correctly displayed.

Further, according to the first embodiment, respective encoders do not require to perform complicated relative calculation. Therefore, as compared to a method in which the encoding system outputs one system stream, the high-resolution moving-picture signal can be correctly displayed more easily. That is, according to the first embodiment, the encoding/decoding system can be built by using general-purpose low-performance encoders and decoders, and therefore the encoding/decoding system can be developed in a short period.

A case that a method for transmitting a plurality of system streams from the encoding system including the encoders to the decoding system including the decoders has been explained as the first embodiment. However, the present invention is not limited thereto, and the present invention can be applied to an encoding system method in which one-picture image data is encoded by the encoders so that each piece of the encoded data encoded by each encoder becomes a one-picture slice, and the encoding system outputs one system stream, or a decoding system method in which each of the decoders decodes one system stream including a video stream in which one picture includes a plurality of slices, for each slice. A case that an encoding system method in which the encoding system outputs one system stream is applied to the present invention is explained, as a second embodiment of the present invention.

An outline and characteristics of the encoding system according to the second embodiment, configuration thereof, a process procedure by the encoding system according to the second embodiment, and effects of the second embodiment will be explained sequentially.

Figure 9:
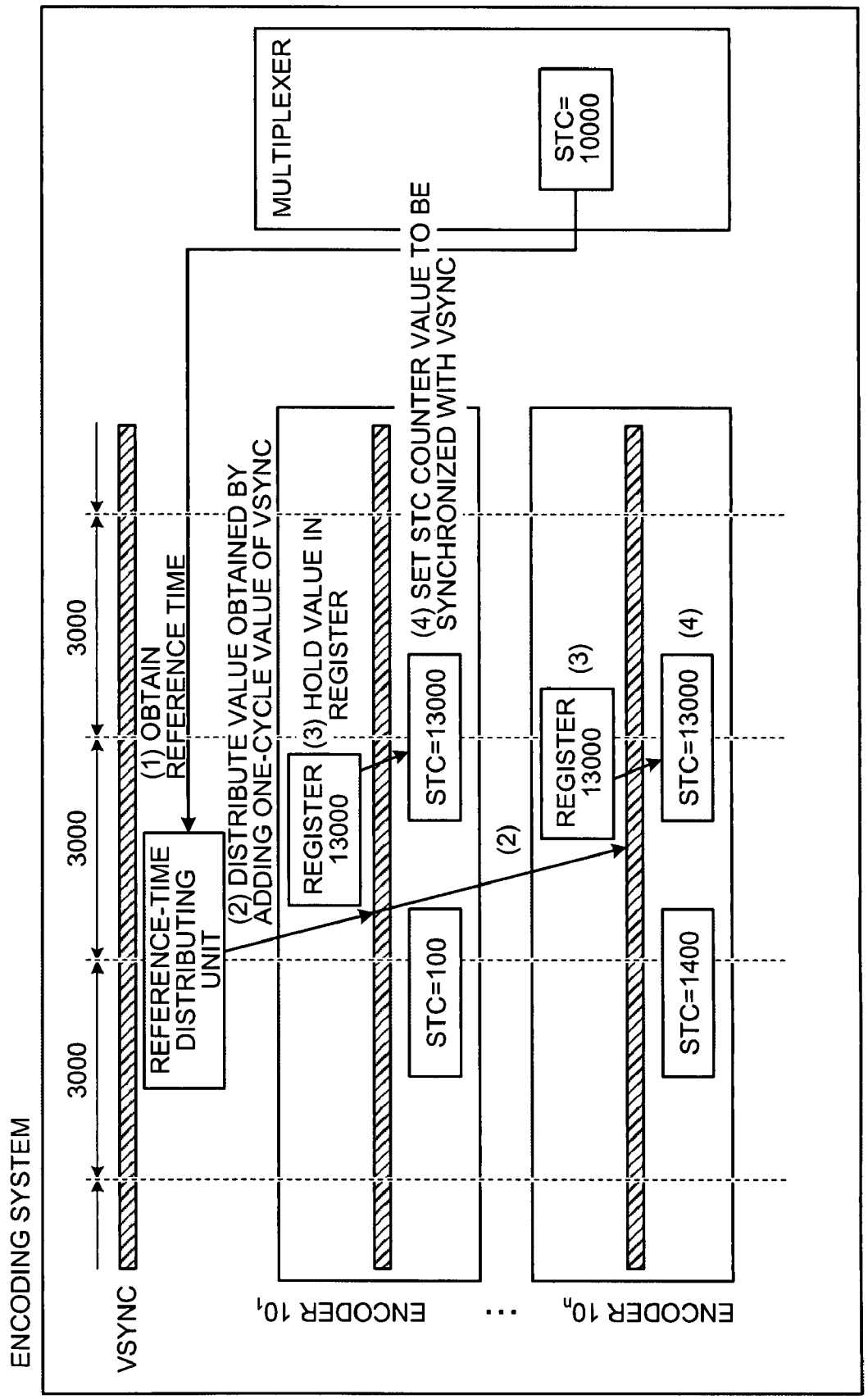
FIG. 9 is a schematic diagram for explaining an outline and characteristics of an encoding system according to a second embodiment of the present invention.

The outline and characteristics of the encoding system according to the second embodiment are explained with reference to FIG. 9. FIG. 9 is a schematic diagram for explaining the outline and characteristics of the encoding system according to the second embodiment.

In the encoding system according to the second embodiment, one-picture image data is encoded by a plurality of encoders so that each piece of the encoded data encoded by each encoder becomes one-picture slice. Therefore, it is a main characteristic of the encoding system to correctly display a high-resolution moving-picture signal.

Briefly explaining the main characteristic, the encoding system according to the second embodiment includes, as shown in FIG. 9, a plurality of encoders (see "encoder 1" to "encoder n"). The encoding system according to the second embodiment includes a reference-time distributing unit, which may also be referred to as a "distributing unit", in addition to the encoders. The encoding system according to the second embodiment further includes the STC counter in the multiplexer.

In the second embodiment, a case that the encoding system includes the reference-time distributing unit in addition to the encoders is explained. However, the present invention is not limited thereto, and the present invention can be similarly applied to a case that one encoder of the encoders includes the reference-time distributing unit, a case that the multiplexer includes the reference-time distributing unit, or the like. In the second embodiment, a case that the multiplexer includes the STC counter is explained. However, the present invention is not limited thereto, and the present invention is also applicable to a case that one STC counter of the encoders is used instead of the STC counter in the multiplexer.

In such a configuration, the encoding system according to the second embodiment obtains the STC counter value of the multiplexer to be synchronized with the VSYNC, as a reference time used as a reference when the sliced portion of the image data is encoded by the respective encoders in the reference-time distributing unit (see FIG. 9(1)). For example, as shown in FIG. 9, the reference-time distributing unit obtains a value "STC=10000" of the STC counter in the multiplexer as the reference time.

The encoding system distributes a value obtained by adding one-cycle value of VSYNC to the obtained STC counter value, to each of the encoders (see FIG. 9(2)). For example, as shown in FIG. 9, the reference-time distributing unit distributes a value "STC=13000" obtained by adding the obtained STC counter value "STC=10000" of the multiplexer to one-cycle value "3000" of VSYNC to each of the encoders.

Upon reception of the value distributed by the reference-time distributing unit, the respective encoders hold the value in a register included in the encoder (see FIG. 9(3)). For example, as shown in FIG. 9, upon reception of the value "STC=13000" distributed by the reference-time distributing unit, each of the encoders holds the value "STC=13000" in the register.

Subsequently, the respective encoders set the value held in the register as a value of the STC counter included in the encoder so that the value synchronizes with the VSYNC first received after holding the value (see FIG. 9(4)). For example, as shown in FIG. 9, each of the encoders sets the value "STC=13000" as a value of the STC counter included in the encoder.

Thus, the encoding system according to the second embodiment can achieve synchronization of the display time, thereby enabling correct display of the high-resolution moving-picture signal.

More specifically, the STC counter values completely match each other and the presentation time stamps (PTS) match each other between the encoders. Therefore, on the decoding system side that decodes the system stream, synchronization of the display time can be achieved, and the high-resolution moving-picture signal can be correctly displayed.

Figure 10:
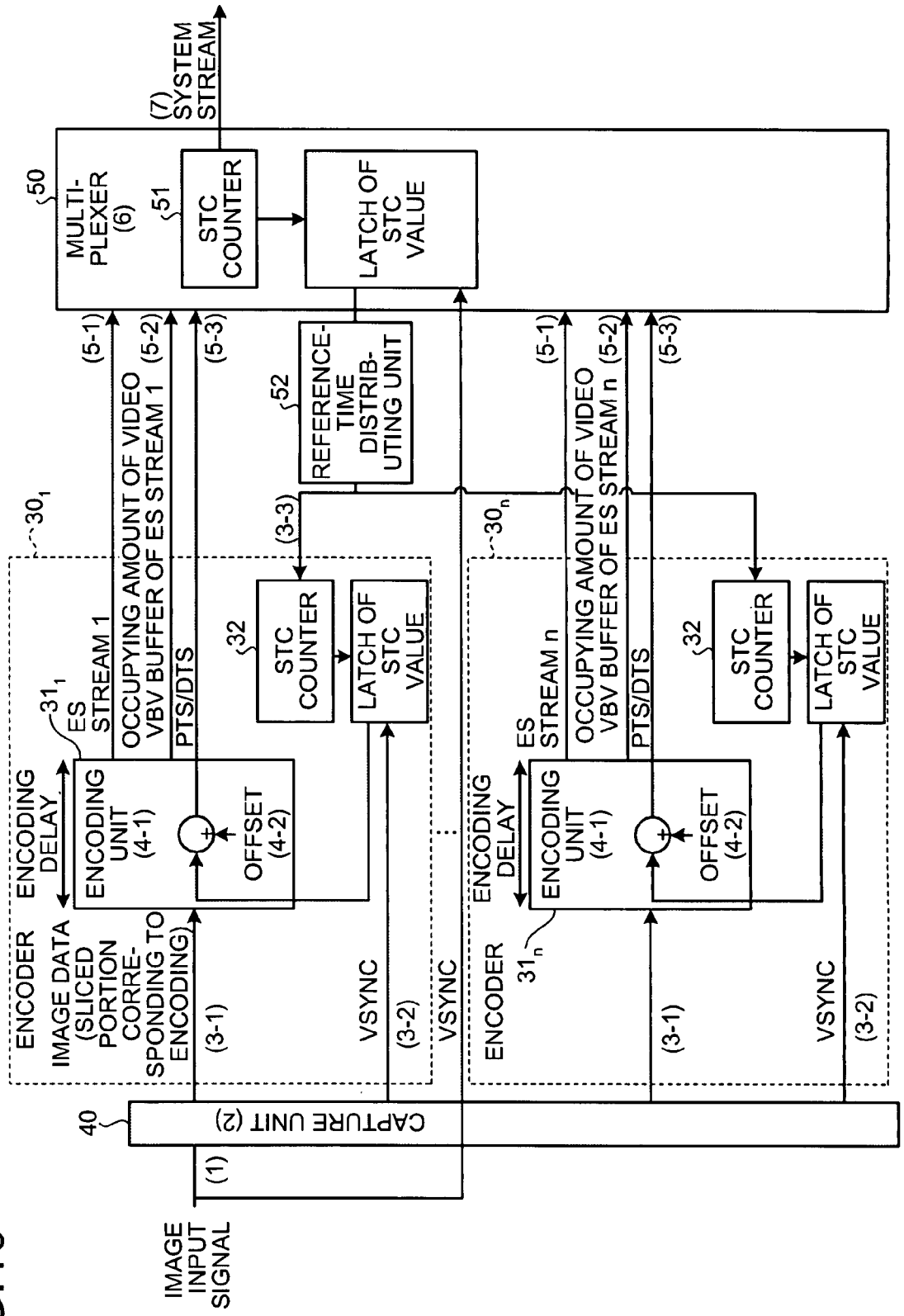
FIG. 10 is a block diagram of the configuration of the encoding system according to the second embodiment.
Figure 11:
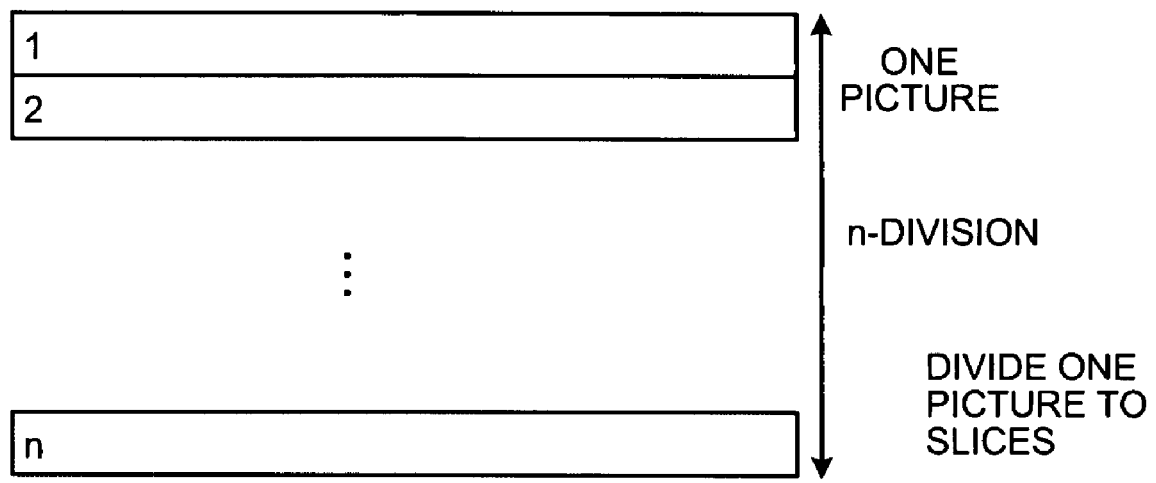
FIG. 11 is a schematic diagram for explaining division of one picture by slicing.
Figure 12:
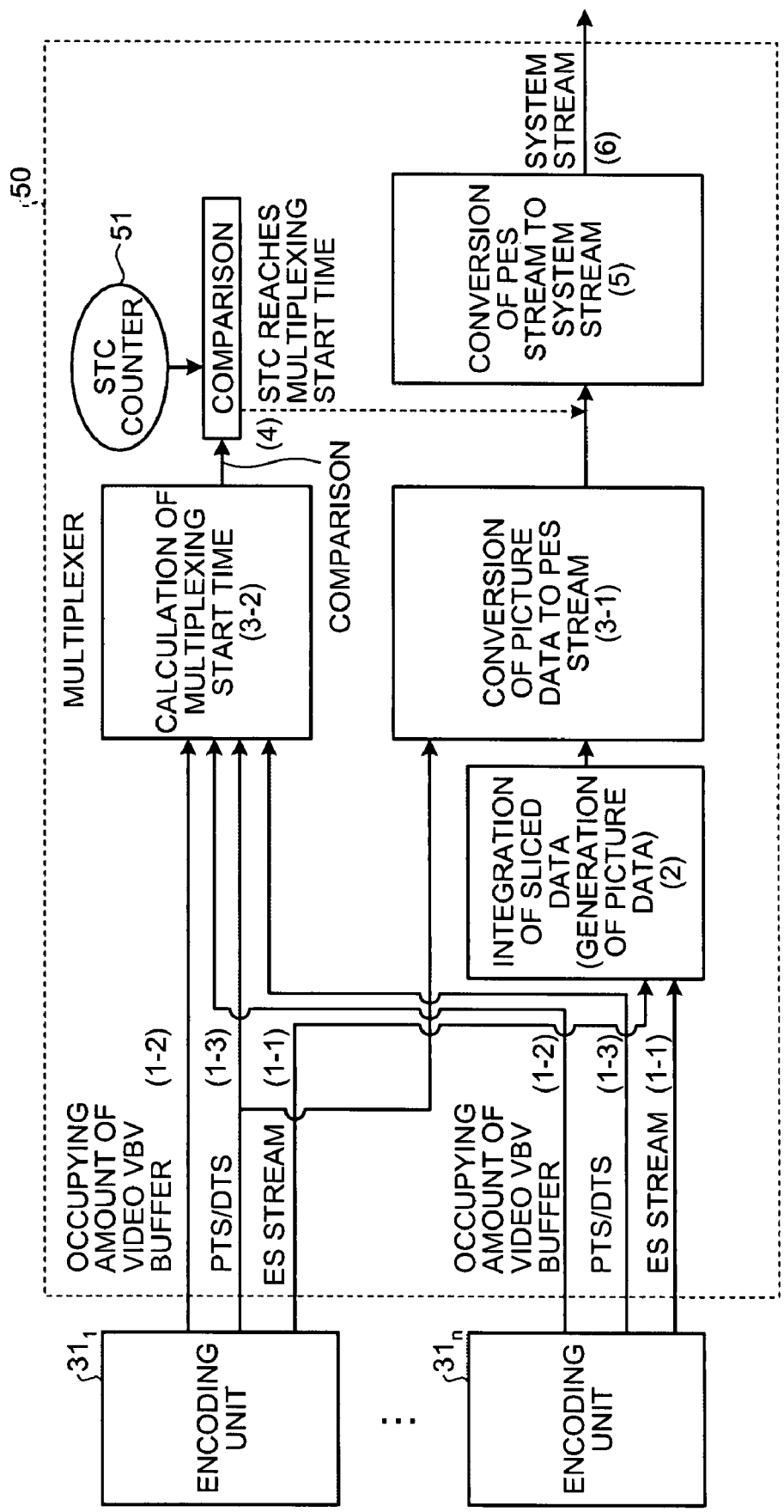
FIG. 12 is a schematic diagram for explaining a multiplexer in the encoding system.
Figure 13A:
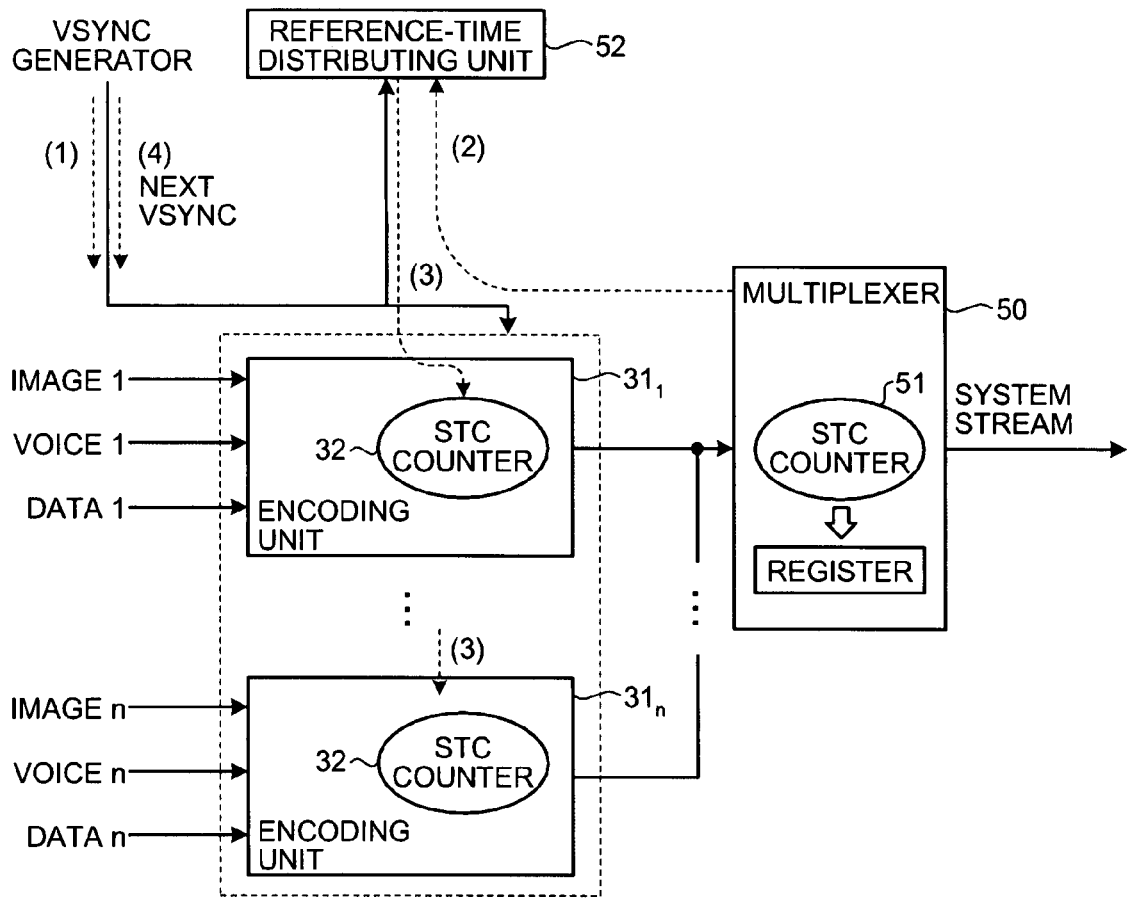
FIG. 13 is a schematic diagram for explaining distribution of a system time clock (STC)
Figure 13B:
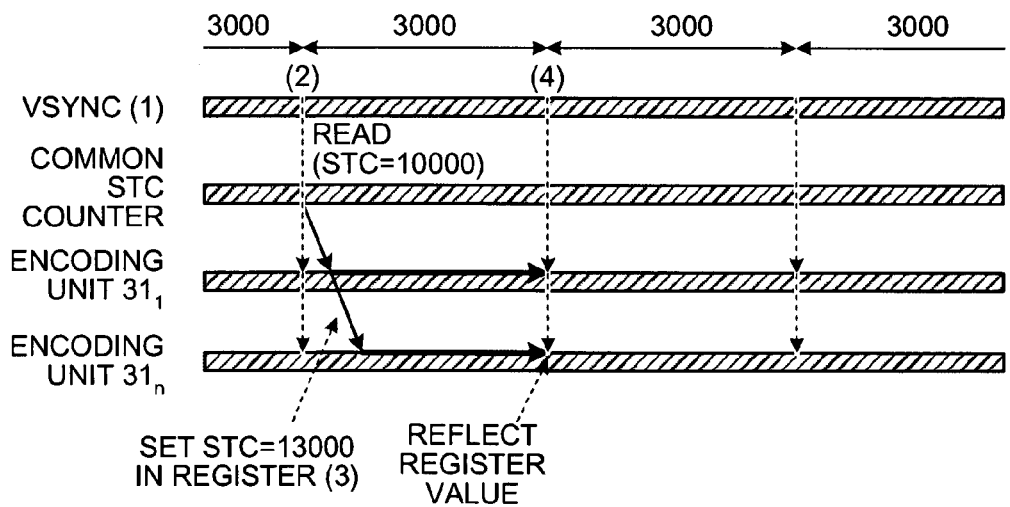

The configuration of the encoding system according to the second embodiment is explained with reference to FIGS. 10 to 13. FIG. 10 is a block diagram of the configuration of the encoding system according to the second embodiment, FIG. 11 is a schematic diagram for explaining division of one picture by slicing, FIG. 12 is a schematic diagram for explaining the multiplexer in the encoding system, and FIG. 13 is a schematic diagram for explaining distribution of STC.

The configuration of the encoding system according to the second embodiment is explained with reference to FIG. 10. The encoding system according to the second embodiment receives an input of the high-resolution image data, divides the image data into a plurality of slices, and encodes the image data for each slice by the encoders to output one system stream (TS stream or PS stream). The encoding system includes encoders $30_1$ to $30_n$, a capture unit 40, a multiplexer 50, and a reference-time distributing unit 52, as units closely related to the present invention. Numbers from (1) to (7) shown in FIG. 10 represent one example of a flow of the image data in the whole encoding system.

The capture unit 40 receives an input of the high-resolution image data (an analog signal or an SDI signal), captures the received image data, stores the captured image data in a memory, and then, outputs the stored image data for a sliced portion to encoding units $31_1$ to $31_n$, for which the encoding units $31_1$ to $31_n$ perform encoding of the image data, (see FIG. 10(1) to (3-1)). For example, as shown in FIG. 11, the capture unit 40 divides the high-resolution image data into a plurality of slices (n-division in FIG. 11) to output one sliced portion to each encoding unit 31.

The capture unit 40 outputs the VSYNC to the encoders $30_1$ to $30_n$ together with the high-resolution image data (see FIG. 10(3-2)).

Each encoder 30 encodes the image data for one sliced portion having received from the capture unit 40 and outputs the ES stream. Each encoding unit 31 includes each encoding unit 31 and an STC counter 32 as the units closely related to the present invention. The "encoding unit 31" may also be referred to as a "setting unit".

Upon reception of a value of an input having received from the reference-time distributing unit 52, the encoding unit 31 holds the value in the register (not shown), and sets the value held in the register as the value of the STC counter 32 included in the encoder 30 so that the value synchronizes with the VSYNC first received after holding the value (see FIG. 10(3-3)). The encoding unit 31 is included in each of the encoders $30_1$ to $30_n$. However, in the second embodiment, because the value of the STC counter 32 is set according to the above method, the STC counter value completely match each other between the encoders $30_1$ to $30_n$, and the PTS described later completely match each other.

The encoding unit 31 receives an input of the image data for one sliced portion from the capture unit 40, compresses and encodes the received image data for one sliced portion (for example, by using the H.264 encoding method, hereinafter, collectively referred to as "encodes"), and outputs the encoded image data (ES stream) to the multiplexer 50 (see FIGS. 10(4-1) and (5-1)). The encoding unit 31 further calculates an occupying amount of video VBV buffer of the ES-stream, and outputs the encoded image data (ES stream) to the multiplexer 50, as well as a calculation result of the occupying amount of video VBV buffer of the ES-stream to the multiplexer 50 (see FIG. 10(5-2)).

Concurrently therewith, the encoding unit 31 latches the value (PTS) of the STC counter 32 indicating the time when the image data has been captured by the encoding unit 31 from the STC counter 32, and calculates PTS/DTS by adding an offset (encoding delay time determined as the delay time which will occur at maximum at the time of encoding by the encoder 30) to the value of the latched STC counter 32, and outputs the calculated PTS/DTS to the multiplexer 50 (see FIGS. 10(4-2) and (5-3)). The reason why such an offset is added is that timeout does not occur at the time of output from the multiplexer 50. In the second embodiment, because the STC counter values completely match each other between the encoders $30_1$ to $30_n$, the PTS latched from the STC counter 32 by the encoding unit 31 also completely match each other between the encoders $30_1$ to $30_n$.

The multiplexer 50 receives the encoded image data (ES stream), the calculation result of the occupying amount of video VBV buffer of the ES-stream, and an input of the PTS/DTS from the encoding unit 31, and converts the received ES stream to the PES stream and the converted PES stream to a system stream (see FIGS. 10(5-1) to (5-3), (6), and (7).

The multiplexer 50 has an STC counter 51 built therein, as shown in FIG. 10, and outputs the value of the STC counter 51 to the reference-time distributing unit 52 so that the value synchronizes with the VSYNC (the reference-time distributing unit 52 obtains the value of the STC counter 51 in the multiplexer 50 so that the value synchronizes with the VSYNC).

The multiplexer 50 is explained below in detail with reference to FIG. 12. At first, the multiplexer 50 respectively receives an input of the encoded image data (ES stream) from the encoding units $31_1$ to $31_n$ (see FIG. 12(1-1)), integrates the received ES stream (sliced data) to generate one-picture picture data (see FIG. 12(2)), and converts the generated one-picture picture data to the PES stream (see FIG. 12(3-1)).

The multiplexer 50 concurrently receives an input of the calculation result of the occupying amount of video VBV buffer of the ES-stream, respectively, from the encoding units $31_1$ to $31_n$ (see FIG. 12(1-2)) and an input of the PTS/DTS from the encoding units 31 (1-$n$) (see FIG. 12(1-3)), and calculates the multiplexing start time (see FIG. 12(3-2)). The multiplexing start time is defined as "multiplexing start time= (DTS)−(occupying amount of video VBV buffer/video bit rate)".

The multiplexer 50 compares the calculated multiplexing start time with the value of the STC counter 51 (see FIG. 12(4)), and converts the PES stream to the system stream immediately before the value of the STC counter 51 reaches the multiplexing start time (see FIG. 12(5)). Lastly, the multiplexer 50 outputs the converted system stream (see FIG. 12(6)).

Returning to FIG. 10, the reference-time distributing unit 52 obtains the value of the STC counter 51 in the multiplexer 50 as a reference time, which is a reference when the sliced portion of the image data is encoded in the respective encoders $30_1$ to $30_n$ so that the value synchronizes with the VSYNC (see FIG. 10(3-3)).

Distribution of the reference time by the reference-time distributing unit 52 is explained in detail with reference to FIG. 13. At first, the reference-time distributing unit 52 obtains the value of the STC counter 51 in the multiplexer 50 as the reference time (reference time when the sliced portion of the image data is encoded in the respective encoders $30_1$ to $30_n$) so that the value synchronizes with the VSYNC (see FIGS. 13(1) and (2)).

The reference-time distributing unit 52 then distributes a value obtained by adding a one-cycle value of VSYNC to the obtained value of the STC counter 51 to each of the encoders $30_1$ to $30_n$ (encoding units $31_1$ to $31_n$) (see FIG. 13(3)).

Upon reception of the value distributed by the reference-time distributing unit 52, each of the encoding units $31_1$ to $31_n$ in the encoders $30_1$ to $30_n$ holds the value in a register included in the encoder 30, and sets the value held in the register as the value of the STC counter 32 included in the encoder 30 (encoding unit 31) so that the value synchronizes with the VSYNC first received after holding the value (see FIG. 13(4)).

Thus, the same PTS is added at the time when the image data for one sliced portion is captured by the encoding unit $31_1$ in each of the encoders $30_1$ to $30_n$.

Figure 14:
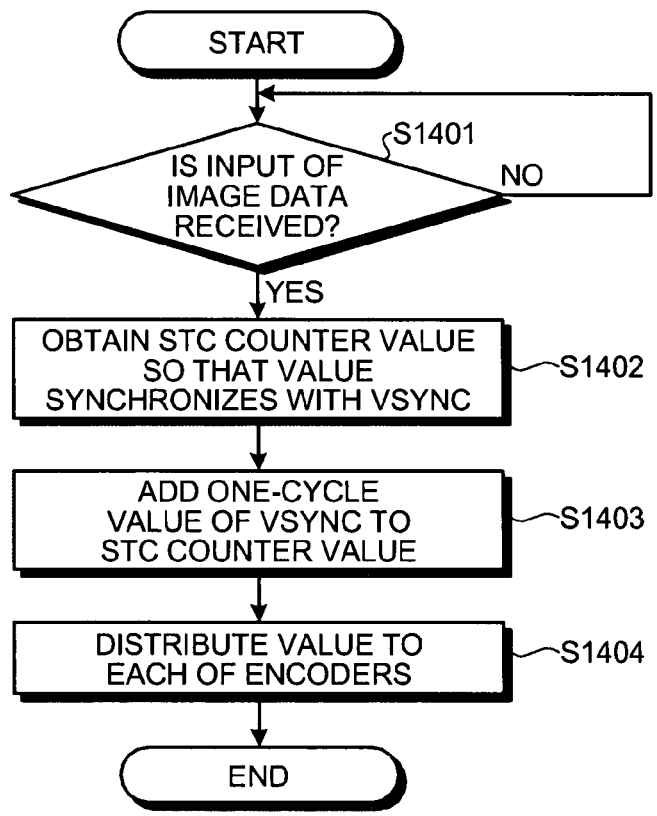
FIG. 14 is a flowchart of a process procedure performed by a reference-time distributing unit according to the second embodiment.
Figure 15:
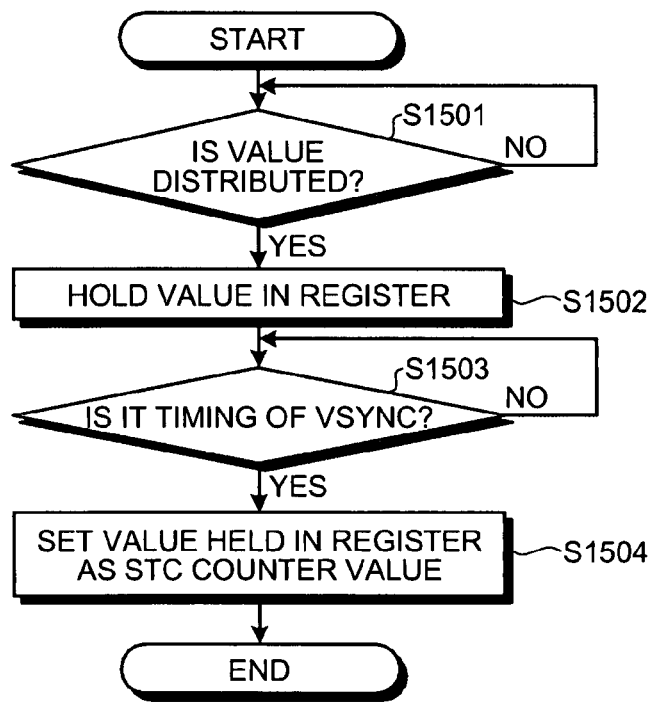
FIG. 15 is a flowchart of a process procedure performed by an encoding unit according to the second embodiment.

A process procedure performed by the encoding system according to the second embodiment is explained with reference to FIGS. 14 and 15. Only a process procedure performed by the reference-time distributing unit and a process procedure performed by the encoding unit (a process procedure relating to setting of the STC counter value), of the process procedure performed by the encoding system according to the second embodiment, are explained below as a part closely related to the characteristic of the present invention. FIG. 14 is a flowchart of a process procedure performed by the reference-time distributing unit according to the second embodiment, and FIG. 15 is a flowchart of a process procedure performed by the encoding unit according to the second embodiment.

As shown in FIG. 14, the encoding system according to the second embodiment determines whether an input of the image data has been received (step S1401). When the input has not been received (NO at step S1401), the encoding system returns to the process for determining whether the input of the image data has been received.

On the other hand, when the input has been received (YES at step S1401), the encoding system obtains the value of the STC counter 51 in the multiplexer 50 so that the value synchronizes with the VSYNC (step S1402).

The encoding system adds one-cycle value of the VSYNC to the obtained value of the STC counter 51 (step S1403).

The encoding system then distributes the value obtained by the addition to the respective encoders $30_1$ to $30_n$ (encoding units $31_1$ to $31_n$) (step S1404).

Subsequently, as shown in FIG. 15, the encoding system according to the second embodiment determines whether the value has been distributed to the respective encoders $30_1$ to $30_n$ (encoding units $31_1$ to $31_n$) (step S1501). When the value has not been distributed (NO at step S1501), the encoding system returns to the process for determining whether the value has been distributed to the respective encoders.

On the other hand, when the value has been distributed (YES at step S1501), the encoding system holds the value in the register in the encoding unit 31 (step S1502).

The encoding unit 31 in the encoding system determines whether it is the timing of the VSYNC (step S1503). When it is not the timing of the VSYNC (NO at step S1503), the encoding system returns to the process for determining whether it is the timing of the VSYNC in the encoding unit 31.

On the other hand, when it is the timing of the VSYNC (YES at step S1503), in the encoding system, the encoding unit 31 sets the value held in the register as the value of the STC counter 32 so that the value synchronizes with the VSYNC, because it is the VSYNC received first after holding the value in the register (step S1504).

The encoding system according to the second embodiment can achieve synchronization of the display time and correctly display the high-resolution moving-picture signal.

According to the second embodiment, in the encoding system, encoders encode one-picture image data so that each piece of the encoded data encoded by the encoders becomes a slice of one picture. The encoding system then obtains a value of a predetermined STC counter as a reference time, which becomes a reference at the time of encoding the sliced portion of the image data in each of the encoders, so that the value of the predetermined STC counter synchronizes with the video vertical-synchronizing signal, and distributes the value obtained by adding one-cycle value of the video vertical-synchronizing signal to the obtained STC counter value to each of the encoders. Upon reception of the distributed value, each of the encoders holds the value in the register included in the encoder, and sets the value held in the register as the value of the STC counter included in the encoder so that the value synchronizes with the video vertical-synchronizing signal first received after holding the value in the register. Accordingly, synchronization of the display time can be achieved, thereby enabling correct display of the high-resolution moving-picture signal.

More specifically, the values of the STC counters completely match each other between the encoders, and therefore the PTSs completely match each other. Therefore, on the decoding system side that decodes the system stream, synchronization of the display time can be achieved, thereby enabling correct display of the high-resolution moving picture.

According to the second embodiment, because the encoding system outputs one system stream, the decoding system side requires only a general method for decoding one system stream, thereby enlarging a target of the decoding system that can be combined therewith.

A case that the encoding system that encodes one-picture image data by a plurality of encoders so that each piece of the encoded data encoded by the encoders becomes a slice of one picture, and outputs one system stream is applied to the present invention has been explained as the second embodiment. However, the present invention is not limited thereto, and the present invention can be similarly applied to a decoding system that decodes one system stream including a video stream, in which one picture includes a plurality of slices, by a plurality of decoders for each slice. A case that the decoding system that decodes one system stream including the video stream, in which one picture includes the slices, is applied to the present invention is explained below, as a third embodiment of the present invention.

An outline and characteristics of, the decoding system according to the third embodiment, configuration thereof, process procedure performed by the decoding system according to the third embodiment, and effects of the third embodiment are sequentially explained below.

Figure 16:
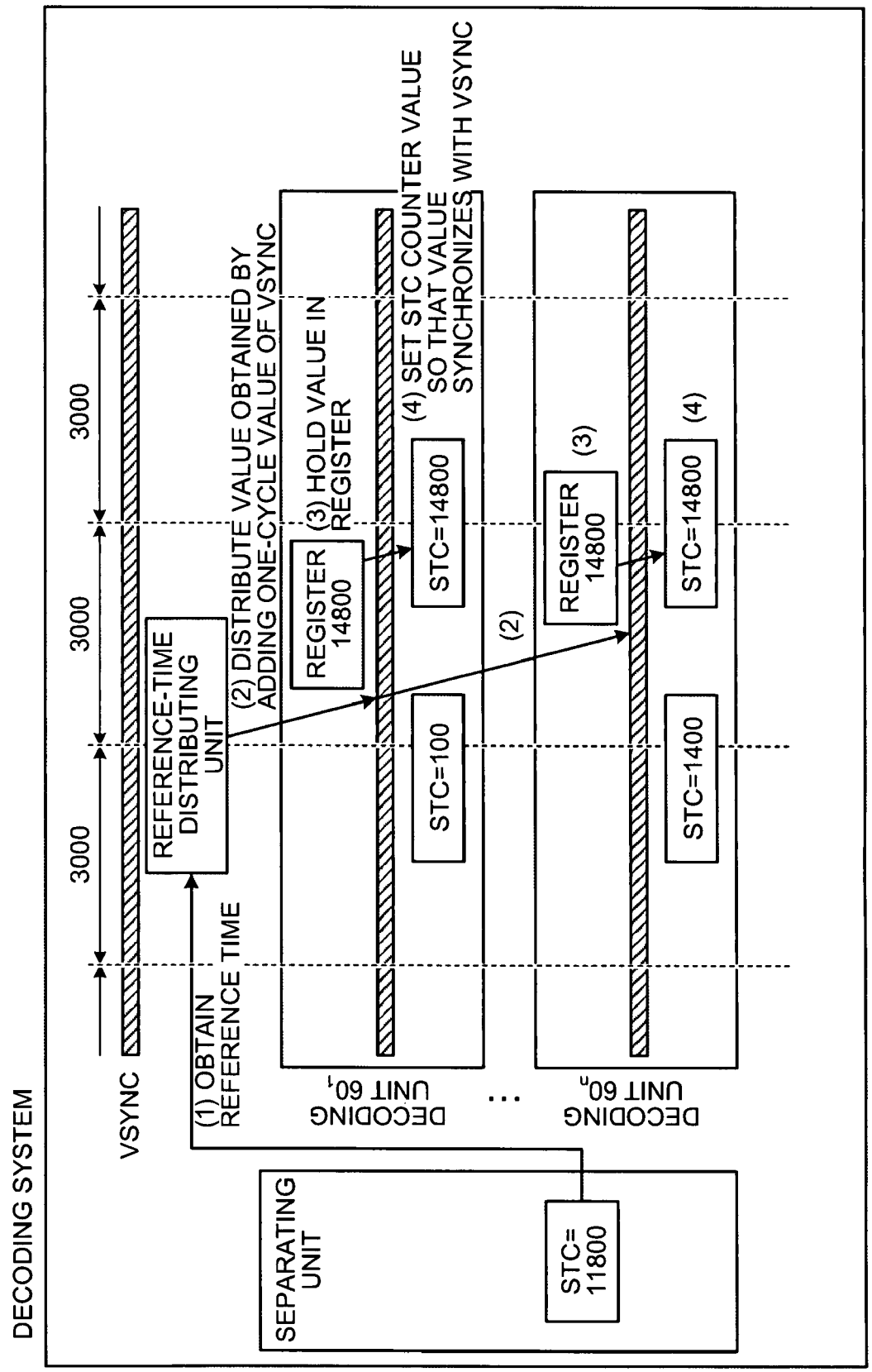
FIG. 16 is a schematic diagram for explaining an outline and characteristics of a decoding system according to a third embodiment of the present invention.

The outline and characteristics of the decoding system according to the third embodiment are explained with reference to FIG. 16. FIG. 16 is a schematic diagram for explaining the outline and characteristics of the decoding system according to the third embodiment.

The decoding system according to the third embodiment decodes the system stream including the video stream, in which one picture includes the slices by each of the decoders for each slice. Therefore, it is a main characteristic of the decoding system to correctly display the high-resolution moving-picture signal.

Briefly explaining the main characteristic, the decoding system according to the third embodiment includes, as shown in FIG. 16, a plurality of decoders (see "decoder 1" to "decoder n"). Further, the decoding system according to the third embodiment includes the reference-time distributing unit in addition to the decoders. Further, the decoding system according to the third embodiment includes the STC counter in the distributing unit.

In the third embodiment, a case that the decoding system includes the reference-time distributing unit in addition to the decoders is explained. However, the present invention is not limited thereto, and is also applicable to a case that one decoder of the plurality of decoders includes the reference-time distributing unit, or a case that the separating unit includes the reference-time distributing unit. In the third embodiment, a case that the STC counter is included in the separating unit is explained. However, the present invention is not limited thereto, and is also applicable to a case that one STC counter of the decoders is used instead of the STC counter in the separating unit.

In such a configuration, in the decoding system according to the third embodiment, the reference-time distributing unit obtains a value of the STC counter in the separating unit as a reference time used when a sliced portion of the system stream is decoded by each of the decoders, so that the STC counter value synchronizes with the VSYNC (see FIG. 16(1)). For example, as shown in FIG. 16, the reference-time distributing unit obtains a value of the STC counter "STC=11800" in the separating unit.

The decoding system then distributes a value obtained by adding a one-cycle value of the VSYNC to the obtained STC counter value to each of the decoders (see FIG. 16(2)). For example, as shown in FIG. 16, the decoding system distributes a value "STC=14800" obtained by adding the one-cycle value "3000" of the VSYNC to the obtained STC counter value "STC=11800" to each of the decoders.

Upon reception of the value distributed by the reference-time distributing unit, each of the decoders holds the value in the register included in the decoder (see FIG. 16(3)). For example, as shown in FIG. 16, upon reception of the value "STC=14800" distributed by the reference-time distributing unit, each of the decoders holds the value "STC=14800" in the register.

Subsequently, each of the decoders sets the value held in the register as the value of the STC counter included in the decoder, so that the value synchronizes with the VSYNC first received after holding the value (see FIG. 16(4)). For example, as shown in FIG. 16, each of the decoders sets the value "STC=14800" as the value of the STC counter included in the decoder.

Thus, the decoding system according to the third embodiment can achieve synchronization of the display time, and the high-resolution moving-picture signal can be correctly displayed.

More specifically, because the values of the STC counters completely match each other between the decoders, synchronization of the display time can be achieved, thereby enabling correct display of the high-resolution moving-picture signal.

Figure 17:
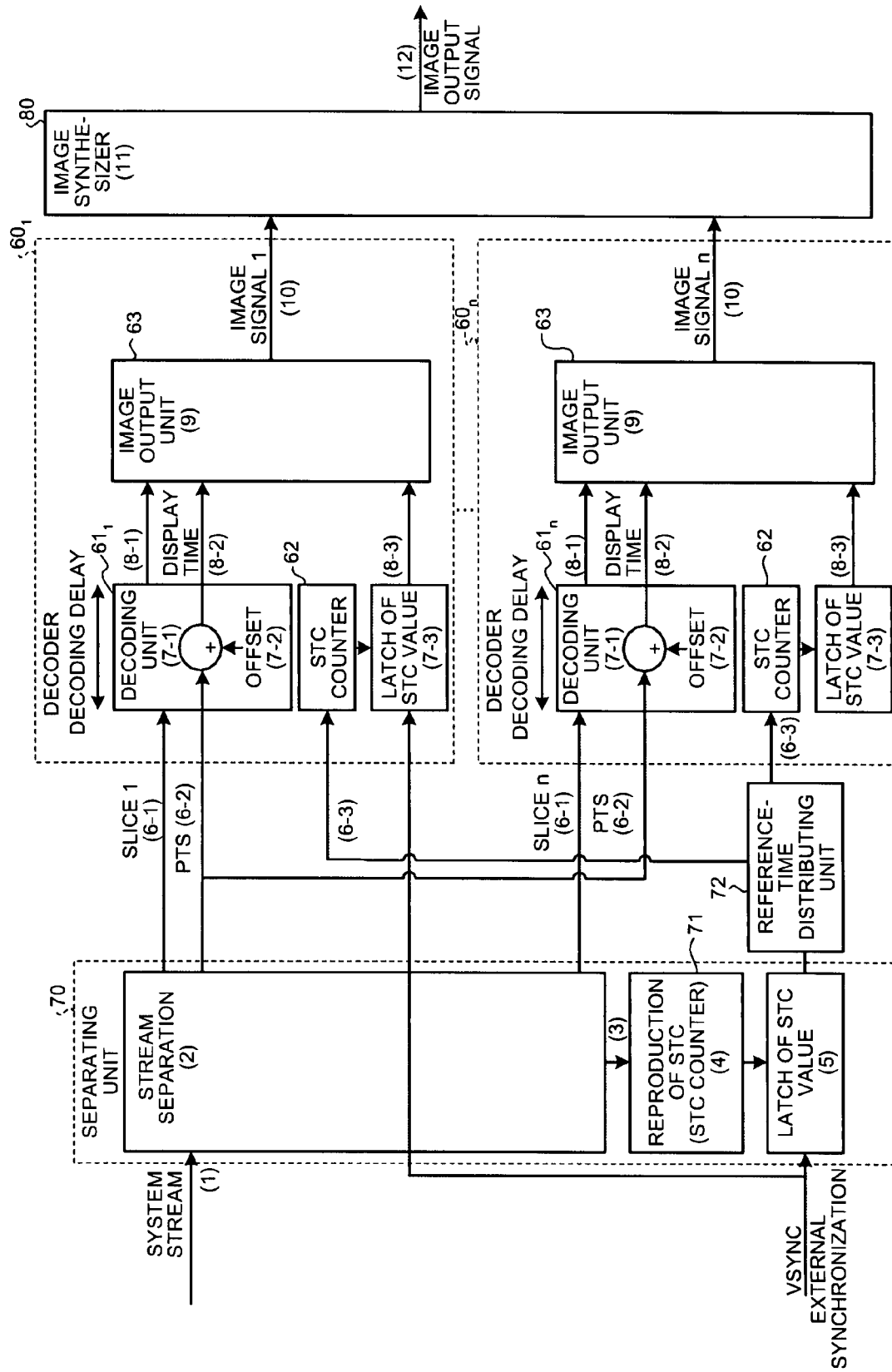
FIG. 17 is a block diagram of the configuration of the decoding system according to the third embodiment.
Figure 19A:
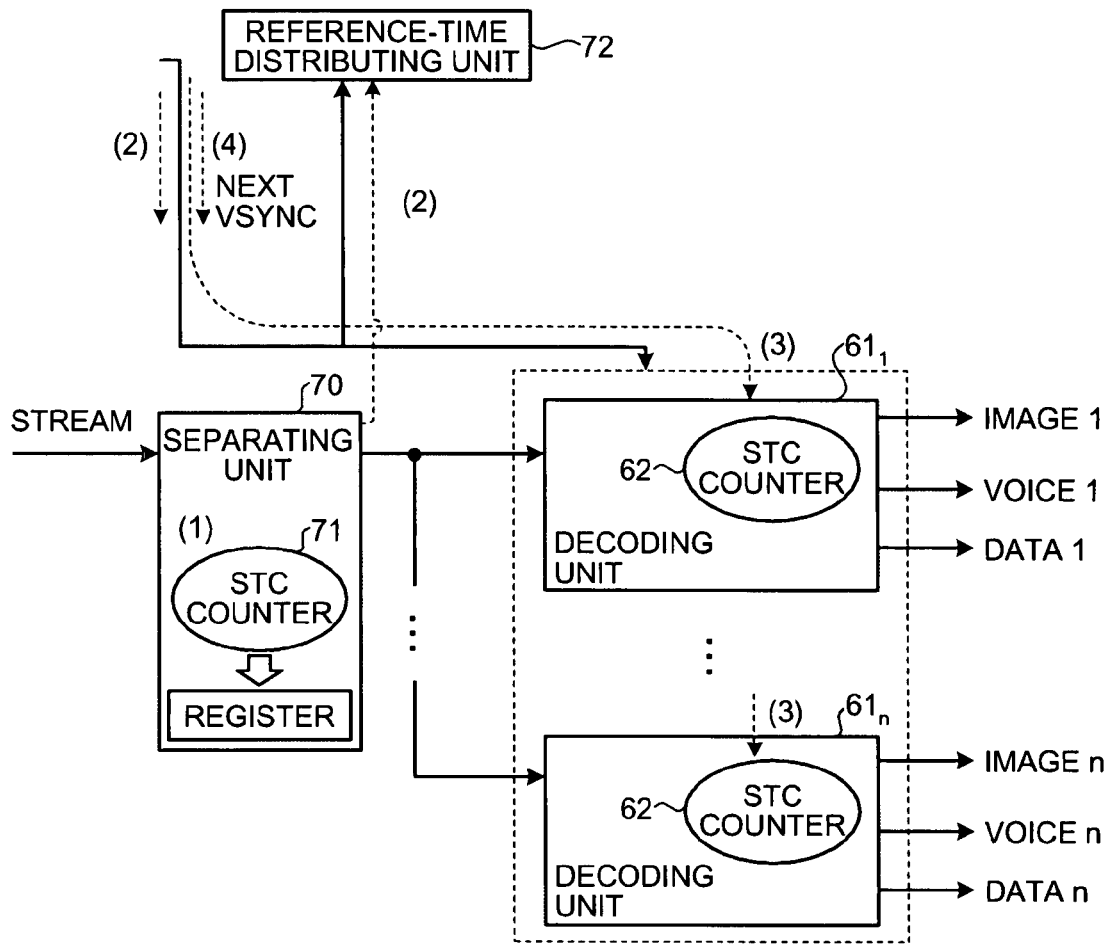
FIG. 19 is a schematic diagram for explaining distribution of the STC.
Figure 19B:
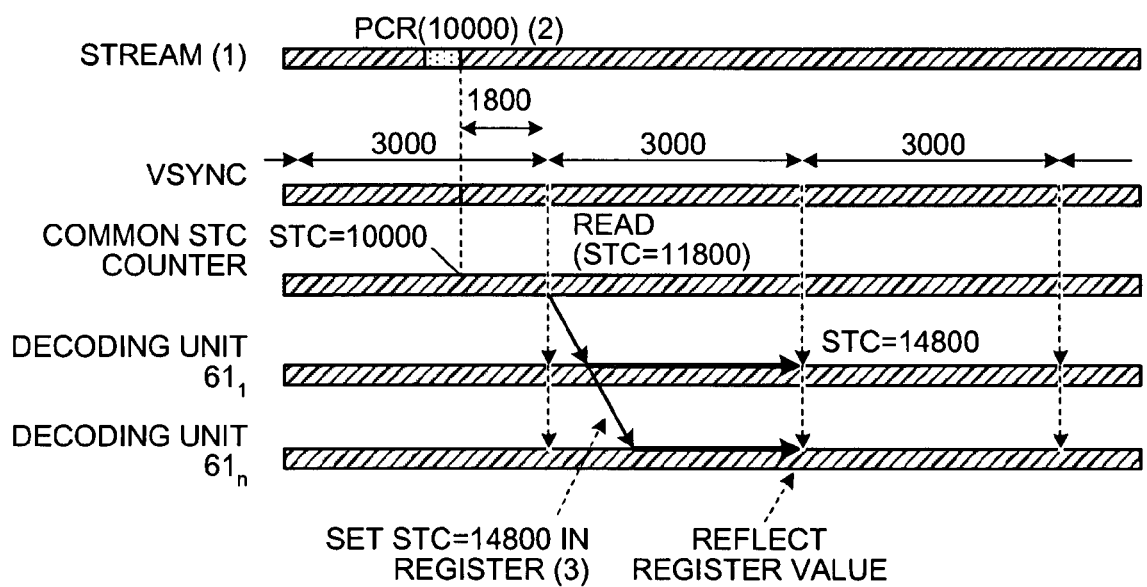

The configuration of the decoding system according to the third embodiment is explained next with reference to FIGS. 17 to 19. FIG. 17 is a block diagram of the configuration of the decoding system according to the third embodiment, FIG. 18 is a schematic diagram for explaining the separating unit in the decoding system, and FIG. 19 is a schematic diagram for explaining distribution of the STC.

The configuration of the decoding system according to the third embodiment is explained first with reference to FIG. 17. The decoding system according to the third embodiment receives an input of the system stream, decodes the low-resolution image data for each slice by the decoders, and synchronizes the decoded image data to output the high-resolution image data. The decoding system includes decoders $60_1$ to $60_n$, a separating unit 70, a reference-time distributing unit 72, and an image synthesizer 80 as the units closely related to the present invention. Numbers from (1) to (12) shown in FIG. 17 represent one example of a flow of the image data in the whole decoding system.

The separating unit 70 receives an input of the system stream, converts the received system stream to the PES stream, separates the converted PES stream into an ES stream for each slice, and respectively outputs the separated ES stream for each slice to a plurality of decoding units $61_1$ to $61_n$ (see FIGS. 17(1), (2), and (6-1)).

Further, the separating unit 70 has, as shown in FIG. 17, an STC counter 71 built therein, extracts a system reference time (PCR or SCR) from the system stream, and reproduces the STC counter 71 to set the time as the value of the STC counter 71 (see FIGS. 17(3) and (4)). The separating unit 70 latches the value of the STC counter 71 at the timing of input of a VSYNC signal and outputs the latched value of the STC counter 71 to the reference-time distributing unit 72 (the reference-time distributing unit 72 obtains the value of the STC counter 71 in the separating unit 70 so that the value synchronizes with the VSYNC (see FIG. 17(5)).

The separating unit 70 is explained in detail with reference to FIG. 18. The separating unit 70 receives an input of the system stream (see FIG. 18(1)), and extracts the PES stream and the system reference time according to analysis of the system layer (see FIGS. 18(2), (3-1), and (3-2)). The separating unit 70 then extracts the ES stream (picture data) and PTS from the PES stream according to analysis of the PES layer, and outputs the extracted ES stream and the PTS to the decoding units $61_1$ to $61_n$ (see FIGS. 18(5-1) and (5-2)). The separating unit 70 separates the ES stream (picture data) into an ES stream for each slice and outputs the separated ES stream for each slice to the decoding units $61_1$ to $61_n$ (see FIGS. 18(6) and (7-1)).

The separating unit 70 concurrently reproduces the STC counter 71 based on the extracted system reference time (see FIG. 18(4-2)). The separating unit 70 latches the value of the STC counter 71 at the timing of input of the VSYNC, and outputs the latched value of the STC counter 71 to the decoding units $61_1$ to $61_n$ via the reference-time distributing unit 72 (see FIGS. 18(5-3) and (7-2)).

Returning to FIG. 17, the decoder 60 receives an input of the system stream, decodes the image data extracted from the received system stream, and outputs the low-resolution image data. Each decoder 60 includes each decoding unit 61, an STC counter 62, and an image output unit 63 as the units closely related to the present invention. The "decoding unit 61" may also be referred to as the "setting unit".

The decoding unit 61 receives an input of the ES stream for each slice and PTS/DTS, decodes the received ES stream for each slice to the low-resolution image data, and outputs the decoded low-resolution image data to the image output unit 63 (see FIGS. 17(6-1), (7-1), and (8-1)).

Further, the decoding unit 61 receives an input of the PTS/DTS from the separating unit 70, calculates the display time by adding an offset (estimated maximum value determined as the decoding delay time, which occurs at the time of decoding by the decoder 60) to the received PTS/DTS, and outputs the calculated display time to the image output unit 63 (see FIGS. 17(6-2), (7-2), and (8-2)).

That is, the display time is defined as "display time= (PTS)+(offset)", and the offset is defined as "offset=estimated maximum value determined as the decoding delay time, which occurs at the time of decoding by the decoder 60".

Upon reception of the value from the reference-time distributing unit 72, the decoding unit 61 holds the value in the register (not shown), and sets the value held in the register as a value of the STC counter 62 included in the decoder 60 so that the value synchronizes with the VSYNC first received after holding the value (see FIG. 17(6-3)). The decoding units $61_1$ to $61_n$ are respectively included in the decoders $60_1$ to $60_n$. According to the third embodiment, the values of the STC counters completely match each other between the decoders $60_1$ to $60_n$ by setting the value of the STC counter 62 in the above method.

The image output unit 63 receives an input of the low-resolution image data and the display time from the decoding unit 61, also receives an input of the STC counter value from the STC counter 62, and outputs the received low-resolution image data to the image synthesizer 80 when the received value of the STC counter 62 indicates the display time (see FIGS. 17(8-3), (9), and (10)). In the third embodiment, because the values of the STC counters completely match each other between the decoders $60_1$ to $60_n$, the STC counter values latched by the image output unit 63 from the STC counters 62 also completely match each other between the decoders $60_1$ to $60_n$.

The image synthesizer 80 receives an input of the low-resolution image data from the decoders 60, synthesizes the received low-resolution image data, and outputs the high-resolution image data (see FIGS. 17(11) and (12)).

The reference-time distributing unit 72 obtains the value of the STC counter 71 in the separating unit 70 as the reference time used as a reference when the sliced portion of the image data is decoded in the respective decoders $60_1$ to $60_n$ so that the value synchronizes with the VSYNC (see FIG. 17(5)).

Distribution of the reference time by the reference-time distributing unit 72 is explained in detail with reference to FIG. 19. The reference-time distributing unit 72 obtains the value of the STC counter 71 in the separating unit 70 as the reference time (time used as the reference when the sliced portion of the image data is decoded in the respective decoders $60_1$ to $60_n$) so that the value synchronizes with the VSYNC (see FIGS. 19(1) and (2)).

The reference-time distributing unit 72 distributes the value obtained by adding one-cycle value of the VSYNC to the obtained STC counter value to each of the decoders 60 (see FIG. 19(3)).

Upon reception of the value distributed by the reference-time distributing unit 72, each of the decoding units $61_1$ to $61_n$ in the decoders $60_1$ to $60_n$ holds the value in the register included in the decoder 60, and sets the value held in the register as a value of the STC counter 62 included in the decoder 60 so that the value synchronizes with the VSYNC first received after holding the value (see FIG. 19(4)).

Thus, each of the display time of the image data for one slice, respectively, decoded in the decoding units $61_1$ to $61_n$ in the decoders 60 completely synchronizes with each other between the decoders $60_1$ to $60_n$ based on the completely synchronized STC counter value between the decoders $60_1$ to $60_n$.

Figure 20:
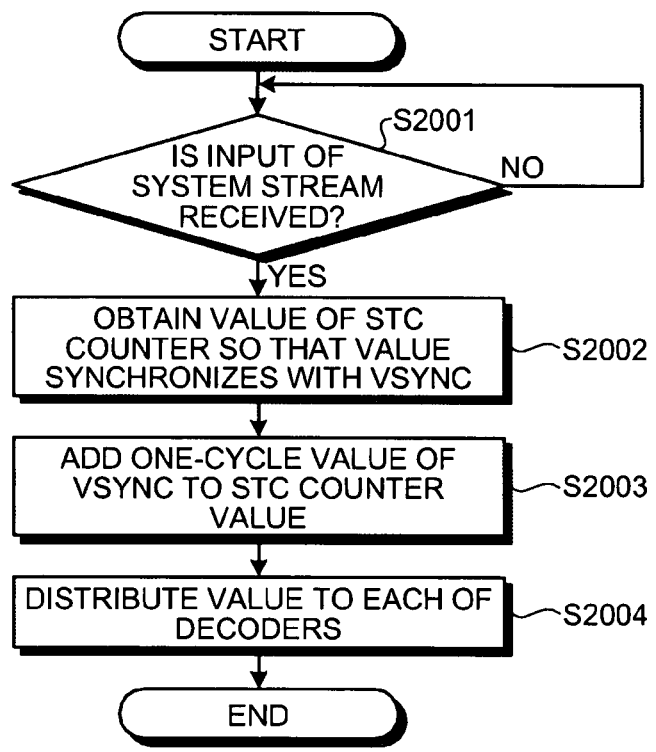
FIG. 20 is a flowchart of a process procedure performed by a reference-time distributing unit according to the third embodiment.
Figure 21:
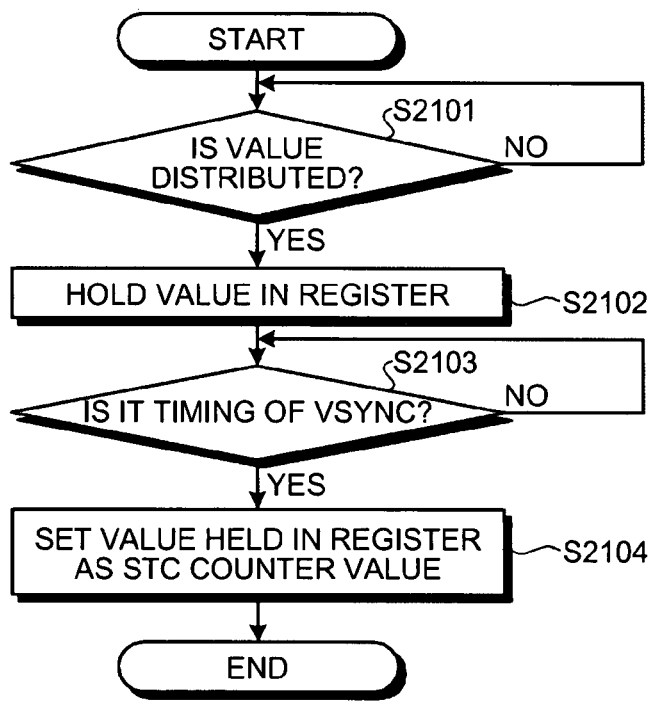
FIG. 21 is a flowchart of a process procedure performed by a decoding unit according to the third embodiment.

A process procedure performed by the decoding system according to the third embodiment is explained with reference to FIGS. 20 and 21. Among process procedures performed by the decoding system, only a process procedure performed by the reference-time distributing unit and a process procedure performed by the decoding unit (a process procedure relating to setting of the STC counter value) are explained below as a part closely related to the characteristics of the present invention. FIG. 20 is a flowchart of the process procedure performed by the reference-time distributing unit according to the third embodiment, and FIG. 21 is a flowchart of the process procedure performed by the decoding unit according to the third embodiment.

As shown in FIG. 20, the decoding system according to the third embodiment determines whether an input of the system stream has been received (step S2001). When the input of the system stream has not been received (NO at step S2001), the decoding system returns to the process for determining whether the input of the system stream has been received.

On the other hand, when the input of the system stream has been received (YES at step S2001), the decoding system obtains a value of the STC counter 71 in the separating unit 70 by the reference-time distributing unit 72 so that the value synchronizes with the VSYNC (step S2002).

The decoding system then adds a one-cycle value of the VSYNC to the obtained value of the STC counter 71 by the reference-time distributing unit 72 (step S2003).

The decoding system distributes the value obtained by adding the one-cycle value of the VSYNC to each of the decoders $60_1$ to $60_n$ (decoding units $61_1$ to $61_n$) (step S2004).

Subsequently, as shown in FIG. 21, in the decoding system according to the third embodiment, the respective decoders $60_1$ to $60_n$ (decoding units $61_1$ to $61_n$) determine whether the distributed value has been received (step S2101). When the distributed value has not been received (NO at step S2101), the decoding system returns to the process for determining whether the distributed value has been received by each of the decoding units $61_1$ to $61_n$.

On the other hand, when the distributed value has been received (YES at step S2101), the decoding system holds the value in the register in the decoding unit 61 (step S2102).

In the decoding system, the decoding unit 61 determines whether it is the timing of the VSYNC (step S2103). When it is not the timing of the VSYNC (NO at step S2103), the decoding system returns to the process for determining whether it is the timing of the VSYNC by the decoding unit 61.

On the other hand, when it is the timing of the VSYNC (YES at step S2103), it is the VSYNC first received after holding the value in the register. Therefore, the decoding system sets the value held in the register as the value of the STC counter 62 by the decoding unit 61 so that the value synchronizes with the VSYNC (step S2104).

Thus, the encoding system according to the third embodiment can achieve synchronization of the display time, thereby enabling correct display of the high-resolution moving-picture signal.

As described above, in the third embodiment, the decoding system decodes the system stream including the video stream, in which one picture includes a plurality of slices, for each slice by each of the decoders. The decoding system obtains the value of the predetermined STC counter as the reference time used as a reference when the sliced portion of the system stream is decoded in the respective decoders $60_1$ to $60_n$ so that the value synchronizes with the video vertical-synchronizing signal. The decoding system further distributes a value obtained by adding one-cycle value of the video vertical-synchronizing signal to the obtained STC counter value to each of the decoders. Upon reception of the distributed value, each of the decoders holds the value in the register included in the decoder, and sets the value held in the register as the value of the STC counter 62 included in the decoder so that the value synchronizes with the video vertical-synchronizing signal first received after holding the value. Accordingly, synchronization of the display time can be achieved, thereby enabling correct display of the high-resolution moving-picture signal.

More specifically, because the values of the STC counters completely match each other between the decoders, synchronization of the display time can be achieved, thereby enabling correct display of the high-resolution moving-picture signal.

According to the third embodiment, because the decoding system decodes one system stream, the encoding system side requires only a general method for outputting one system stream, thereby enlarging a target of the encoding system that can be combined therewith.

While the exemplary embodiments of the present invention have been explained above, the invention can be embodied in various forms other than the above embodiments.

Among the respective process described in the above embodiments, all or a part of the processes (for example, the process for transmitting the data encoded by the encoding system 100 to the decoding system via the transmission system 300) can be performed manually (for example, to temporarily store the data encoded by the encoding system 100, and manually transmit the stored data to the decoding system 200), or all or a part of the process explained as being performed manually can be performed automatically in a known method. In addition, the process procedures, control procedures, specific names, and information including various kinds of data and parameters shown in the present specification or the drawings can be arbitrarily changed unless otherwise specified.

The respective constituent elements of the respective devices shown in the drawings (for example, FIGS. 2, 10, and 17) are functionally conceptual, and physically the same configuration is not always necessary. In other words, the specific mode of dispersion and integration of the devices is not limited to the shown ones, and all or a part thereof can be functionally or physically dispersed or integrated in an arbitrary unit, according to various kinds of load and the status of use. In addition, all or an arbitrary part of various process functions performed by the respective devices can be realized by a CPU or a program analyzed and executed by the CPU, or can be realized as hardware by wired logic.

The encoding/decoding system, the encoding method, and the decoding method explained in the above embodiments can be realized by executing a program prepared in advance by a computer such as a personal computer or a workstation. The program can be distributed via a network such as the Internet. The program can be also recorded on a computer readable recording medium such as hard disk, flexible disk (FD), compact-disk read only memory (CD-ROM), a magneto-optical (MO) disk, or a digital versatile disk (DVD), read from the recording medium and executed by the computer.

According to the present invention, synchronization of the display time can be achieved, thereby enabling correct display of the high-resolution moving-picture signal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An encoding/decoding system comprising:
    an encoding system that includes a plurality of encoders which encode a plurality of pieces of image data, respectively, the pieces of image data being obtained by dividing one-screen image data by a number of encoders; and
    a decoding system that includes a plurality of decoders and that decodes the pieces of image data encoded by the encoding system to display the one-screen image data, the decoders being associated with the encoders in one-to-one correspondence, wherein
    each of the encoders includes
        a first time calculator that calculates a first time by adding an encoding delay time commonly determined between the encoders as a delay time estimated as a maximum delay time at the time of encoding by the encoder, to a value of an STC counter, the value of the STC counter indicating a time when the encoder captures one of the pieces of image data; and
        a transmitting unit that transmits a system stream containing the first time calculated by the first time calculator to the decoder associated with the encoder, and
    each of the decoders includes
        a second time calculator that calculates a second time by adding the first time extracted from the system stream transmitted by the transmitting unit to a maximum value commonly determined between the decoders, the maximum value being estimated as a maximum sum of a decoding delay time which is at the time of decoding by the decoder, and a value of stream fluctuation occurring between the encoders regarding an output time when the respective encoders output the image data encoded respectively by the encoders; and
        an output unit that outputs the pieces of image data decoded from the system stream to a synthesizer that synthesizes the image data at the second time calculated by the second time calculator.

2. An encoding system that encodes image data of one picture by a plurality of encoders so that each piece of the encoded data encoded by the encoders becomes a slice of one picture, the encoding system comprising:
    a distributing unit that obtains a value of a predetermined STC counter as a reference time so that the value of the predetermined STC counter synchronizes with a video vertical-synchronizing signal, and distributes a value obtained by adding one-cycle value of the video vertical-synchronizing signal to the obtained STC counter value to each of the encoders, the reference time being a reference at the time of encoding a sliced portion of the image data in each of the encoders, wherein
    each of the encoders includes
        a setting unit that holds the value distributed by the distributing unit in a register included in the encoder, upon reception of the distributed value, and sets the value held in the register as the value of the STC counter included in the encoder so that the value synchronizes with the video vertical-synchronizing signal first received after holding the value in the register.

3. A decoding system that decodes a system stream including a video stream, in which one picture includes a plurality of slices, by each of a plurality of decoders for each slice, the decoding system comprising:
    a distributing unit that obtains a value of a predetermined STC counter as a reference time so that the value of the predetermined STC counter synchronizes with a video vertical-synchronizing signal, and distributes a value obtained by adding one-cycle value of the video vertical-synchronizing signal to the obtained STC counter value to each of the decoders, the reference time being a reference at the time of decoding the sliced portion of the system stream in each of the decoders, wherein
    each of the decoders includes
        a setting unit that holds the value distributed by the distributing unit in a register included in the decoder, upon reception of the distributed value, and sets the value held in the register as the value of the STC counter included in the decoder so that the value synchronizes with the video vertical-synchronizing signal first received after holding the value in the register.

4. An encoding/decoding method in which a plurality of encoders encode a plurality of pieces of image data, respectively, the pieces of image data being obtained by dividing one-screen image data by a number of encoders, and a plurality of decoders associated with the encoders in one-to-one correspondence decode the pieces of image data encoded by the encoding system to display the one-screen image data, the method comprising:
    calculating a first time by adding an encoding delay time commonly determined between the encoders as a delay time estimated as a maximum delay time at the time of encoding by the encoder, to a value of an STC counter, the value of the STC counter indicating a time when the encoder captures one of the pieces of image data;
    transmitting a system stream containing the first time calculated to the decoder associated with the encoder;
    calculating a second time by adding the first time extracted from the system stream transmitted to a maximum value commonly determined between the decoders, the maximum value being estimated as a maximum sum of a decoding delay time which is at the time of decoding by the decoder, and a value of stream fluctuation occurring between the encoders regarding an output time when the respective encoders output the image data encoded respectively by the encoders; and
    outputting the pieces of image data decoded from the system stream to a synthesizer that synthesizes the image data at the second time calculated.

5. A method for encoding image data of one picture by a plurality of encoders so that each piece of the encoded data encoded by the encoders becomes a slice of one picture, the method comprising:

obtaining a value of a predetermined STC counter as a reference time so that the value of the predetermined STC counter synchronizes with a video vertical-synchronizing signal, the reference time being a reference at the time of encoding a sliced portion of the image data in each of the encoders;

distributing a value obtained by adding one-cycle value of the video vertical-synchronizing signal to the obtained STC counter value to each of the encoders;

holding the value distributed in a register included in the encoder, upon reception of the distributed value; and setting the value held in the register as the value of the STC counter included in the encoder so that the value synchronizes with the video vertical-synchronizing signal first received after holding the value in the register.

6. A method for decoding a system stream including a video stream, in which one picture includes a plurality of slices, by each of a plurality of decoders for each slice, the method comprising:

obtaining a value of a predetermined STC counter as a reference time so that the value of the predetermined STC counter synchronizes with a video vertical-synchronizing signal, the reference time being a reference at the time of decoding the sliced portion of the system stream in each of the decoders;

distributing a value obtained by adding one-cycle value of the video vertical-synchronizing signal to the obtained STC counter value to each of the decoders;

holding the value distributed in a register included in the decoder, upon reception of the distributed value; and setting the value held in the register as the value of the STC counter included in the decoder so that the value synchronizes with the video vertical-synchronizing signal first received after holding the value in the register.

7. A non-transitory computer-readable recording medium that stores therein a computer program for encoding/decoding in a plurality of encoders that encode a plurality of pieces of image data, respectively, the pieces of image data being obtained by dividing one-screen image data by a number of encoders, and a plurality of decoders that are associated with the encoders in one-to-one correspondence and that decode the pieces of image data encoded by the encoding system to display the one-screen image data, the computer program causing a computer to execute:

calculating a first time by adding an encoding delay time commonly determined between the encoders as a delay time estimated as a maximum delay time at the time of encoding by the encoder, to a value of an STC counter, the value of the STC counter indicating a time when the encoder captures one of the pieces of image data;

transmitting a system stream containing the first time calculated to the decoder associated with the encoder;

calculating a second time by adding the first time extracted from the system stream transmitted to a maximum value commonly determined between the decoders, the maximum value being estimated as a maximum sum of a decoding delay time which is at the time of decoding by the decoder, and a value of stream fluctuation occurring between the encoders regarding an output time when the respective encoders output the image data encoded respectively by the encoders; and outputting the pieces of image data decoded from the system stream to a synthesizer that synthesizes the image data at the second time calculated.

8. A non-transitory computer-readable recording medium that stores therein a computer program for encoding image data of one picture by a plurality of encoders so that each piece of the encoded data encoded by the encoders becomes a slice of one picture, the computer program causing a computer to execute:

obtaining a value of a predetermined STC counter as a reference time so that the value of the predetermined STC counter synchronizes with a video vertical-synchronizing signal, the reference time being a reference at the time of encoding a sliced portion of the image data in each of the encoders;

distributing a value obtained by adding one-cycle value of the video vertical-synchronizing signal to the obtained STC counter value to each of the encoders;

holding the value distributed in a register included in the encoder, upon reception of the distributed value; and setting the value held in the register as the value of the STC counter included in the encoder so that the value synchronizes with the video vertical-synchronizing signal first received after holding the value in the register.

9. A non-transitory computer-readable recording medium that stores therein a computer program for decoding a system stream including a video stream, in which one picture includes a plurality of slices, by each of a plurality of decoders for each slice, the computer program causing a computer to execute:

obtaining a value of a predetermined STC counter as a reference time so that the value of the predetermined STC counter synchronizes with a video vertical-synchronizing signal, the reference time being a reference at the time of decoding the sliced portion of the system stream in each of the decoders;

distributing a value obtained by adding one-cycle value of the video vertical-synchronizing signal to the obtained STC counter value to each of the decoders;

holding the value distributed in a register included in the decoder, upon reception of the distributed value; and setting the value held in the register as the value of the STC counter included in the decoder so that the value synchronizes with the video vertical-synchronizing signal first received after holding the value in the register.

* * * * *